United States Patent
Daily et al.

(10) Patent No.: US 9,864,971 B2
(45) Date of Patent: Jan. 9, 2018

(54) SECURE SELF-CHECKOUT STATION

(71) Applicant: Freedom Shopping, Inc., Statesville, NC (US)

(72) Inventors: Michael A. Daily, Clayton, NC (US);
Rob Simmons, Statesville, NC (US);
Shea Coakley, Charlestown, MA (US);
Peter Roy, Jr., Boston, MA (US)

( * ) Notice: Subject to any disclaimer, the term of this patent is extended or adjusted under 35 U.S.C. 154(b) by 0 days.

(21) Appl. No.: 15/617,957

(22) Filed: Jun. 8, 2017

(65) Prior Publication Data
US 2017/0278060 A1    Sep. 28, 2017

Related U.S. Application Data

(63) Continuation of application No. 13/963,896, filed on Aug. 9, 2013, now Pat. No. 9,715,672, which is a
(Continued)

(51) Int. Cl.
*G06F 7/08*     (2006.01)
*G06Q 10/08*    (2012.01)
(Continued)

(52) U.S. Cl.
CPC ............ *G06Q 10/087* (2013.01); *A47F 9/047* (2013.01); *G06Q 20/208* (2013.01); *G07G 1/009* (2013.01);
(Continued)

(58) Field of Classification Search
CPC .... G06Q 10/087; G06Q 20/208; A47F 9/047; G07G 1/0036; G07G 1/0054; G07G 1/009
See application file for complete search history.

(56) References Cited

U.S. PATENT DOCUMENTS 5,238,968 A   8/1993   Morita et al.
5,500,650 A   3/1996   Snodgrass et al.
(Continued)

FOREIGN PATENT DOCUMENTS

JP   08-221661    8/1996
JP   2001076261   3/2001
(Continued)

OTHER PUBLICATIONS

Collins; Avery Designs Passive UHF Tag for Metal; RFID Journal, 2 pages; Mar. 9, 2005.
(Continued)

*Primary Examiner* — Thien M Le
*Assistant Examiner* — Asifa Habib
(74) *Attorney, Agent, or Firm* — Snell & Wilmer L.L.P.

(57) ABSTRACT

A self-checkout system includes a cabinet having a doorway and a vending space. The system includes a secure door enclosing the vending space. The system includes a radio frequency identification (RFID) tag attached to a product. The system includes an RFID reader adjacent the door and configured to read product data from the RFID tag and detect if the product passed through the doorway. The system includes a database configured to store an inventory of products. The system includes a self-checkout apparatus connected to the database. The self-checkout apparatus unlocks the lock when valid account credentials are detected. The self-checkout updates a checkout list to include a product passing from the vending space through the doorway. The self-checkout apparatus presents a confirmation display of the checkout list and allocates all products in the checkout list to the account associated with the account credentials upon receiving a confirmation indication.

20 Claims, 19 Drawing Sheets

Related U.S. Application Data continuation-in-part of application No. 13/683,983, filed on Nov. 21, 2012, now Pat. No. 8,818,885, which is a continuation of application No. 13/488,202, filed on Jun. 4, 2012, now Pat. No. 8,328,096, and a continuation of application No. 11/910,436, filed as application No. PCT/US2005/047149 on Dec. 27, 2005, now Pat. No. 8,191,780.

(60) Provisional application No. 60/669,183, filed on Apr. 7, 2005.

(51) Int. Cl.
*A47F 9/04* (2006.01)
*G07G 1/00* (2006.01)
*G06Q 20/20* (2012.01)

(52) U.S. Cl.
CPC ......... *G07G 1/0036* (2013.01); *G07G 1/0054* (2013.01)

(56) References Cited

U.S. PATENT DOCUMENTS

| | | | |
|---|---|---|---|
| 5,627,544 A | 5/1997 | Snodgrass et al. | |
| 5,745,036 A | 4/1998 | Clare | |
| 5,963,134 A | 10/1999 | Bowers et al. | |
| 5,974,078 A | 10/1999 | Tuttle et al. | |
| 6,025,780 A | 2/2000 | Bowers et al. | |
| 6,101,483 A | 8/2000 | Petrovich et al. | |
| 6,147,604 A | 11/2000 | Wiklof et al. | |
| 6,169,483 B1 | 1/2001 | Ghaffari et al. | |
| 6,294,998 B1 | 9/2001 | Adams et al. | |
| 6,459,726 B1 | 10/2002 | Ovard et al. | |
| 6,486,783 B1 | 11/2002 | Hausladen et al. | |
| 6,497,362 B2 | 12/2002 | Persky et al. | |
| 6,507,279 B2 | 1/2003 | Loof | |
| 6,547,040 B2 | 4/2003 | Goodwin, III | |
| 6,554,187 B2 | 4/2003 | Otto | |
| 6,557,760 B2 | 5/2003 | Goodwin, III | |
| 6,598,790 B1 | 7/2003 | Horst | |
| 6,598,791 B2 | 7/2003 | Bellis, Jr. et al. | |
| 6,648,232 B1 | 11/2003 | Emmert | |
| 6,651,053 B1 | 11/2003 | Rothschild | |
| 6,825,766 B2 | 11/2004 | Hewitt et al. | |
| 6,829,520 B1 * | 12/2004 | Green | G01K 3/04 235/385 |
| 6,837,436 B2 | 1/2005 | Swartz et al. | |
| 6,868,073 B1 | 3/2005 | Carrender | |
| 6,883,710 B2 | 4/2005 | Chung | |
| 6,940,408 B2 | 9/2005 | Ferguson et al. | |
| 6,967,563 B2 | 11/2005 | Bormaster | |
| 6,975,229 B2 | 12/2005 | Carrender | |
| 6,994,252 B2 | 2/2006 | Frich | |
| 7,005,988 B2 | 2/2006 | Mathewson, II et al. | |
| 7,040,541 B2 | 5/2006 | Swartz et al. | |
| 7,045,179 B2 | 5/2006 | Mizutani et al. | |
| 7,107,221 B1 | 9/2006 | Tracy et al. | |
| 7,108,183 B1 | 9/2006 | Cox, Jr. | |
| 7,113,088 B2 | 9/2006 | Frick et al. | |
| 7,123,146 B1 | 10/2006 | Holtzman | |
| 7,133,843 B2 | 11/2006 | Hansmann et al. | |
| 7,150,395 B1 | 12/2006 | White | |
| 7,156,303 B1 | 1/2007 | Holzman | |
| 7,170,415 B2 | 1/2007 | Forster | |
| 7,183,928 B2 | 2/2007 | Redlin | |
| 7,185,809 B2 | 3/2007 | Barton et al. | |
| 7,187,289 B2 | 3/2007 | Eckstein et al. | |
| 7,221,269 B2 | 5/2007 | Onderko et al. | |
| 7,259,678 B2 | 8/2007 | Brown et al. | |
| 7,315,248 B2 | 1/2008 | Egbert | |
| 7,325,734 B2 | 2/2008 | Howarth et al. | |
| 7,328,170 B2 | 2/2008 | Jacobs et al. | |
| 7,416,117 B1 | 8/2008 | Morrison | |
| 7,463,156 B2 | 12/2008 | Baba et al. | |
| 7,466,232 B2 | 12/2008 | Neuwith | |
| 7,522,051 B2 | 4/2009 | Sanari et al. | |
| 7,629,063 B2 | 12/2009 | Yamamoto et al. | |
| 7,652,636 B2 | 1/2010 | Forster et al. | |
| RE41,531 E | 8/2010 | Wood, Jr. | |
| 2001/0000019 A1 | 3/2001 | Bowers et al. | |
| 2002/0096564 A1 | 7/2002 | Bellis, Jr. et al. | |
| 2002/0139617 A1 | 10/2002 | Goodwin, III | |
| 2002/0186133 A1 | 12/2002 | Loof | |
| 2003/0122667 A1 | 7/2003 | Flynn | |
| 2003/0135417 A1 | 7/2003 | Bodin | |
| 2003/0174051 A1 | 9/2003 | Naitou | |
| 2004/0018227 A1 | 1/2004 | Park et al. | |
| 2004/0103034 A1 | 5/2004 | Reade et al. | |
| 2004/0143505 A1 | 7/2004 | Kovach | |
| 2004/0220860 A1 | 11/2004 | Persky et al. | |
| 2005/0027611 A1 | 2/2005 | Wharton | |
| 2005/0040934 A1 | 2/2005 | Shanton | |
| 2005/0049914 A1 | 3/2005 | Parish | |
| 2005/0073417 A1 | 4/2005 | Mathewson et al. | |
| 2005/0110638 A1 * | 5/2005 | Mohr | G06Q 10/087 340/572.1 |
| 2005/0140512 A1 | 6/2005 | Sakama et al. | |
| 2005/0167493 A1 | 8/2005 | Barton et al. | |
| 2005/0173527 A1 | 8/2005 | Conzola | |
| 2005/0269407 A1 | 12/2005 | Harmon | |
| 2005/0289039 A1 | 12/2005 | Greak | |
| 2006/0016885 A1 | 1/2006 | Roberts et al. | |
| 2006/0022825 A1 | 2/2006 | Carrender | |
| 2006/0054710 A1 | 3/2006 | Forster et al. | |
| 2006/0122934 A1 | 6/2006 | White et al. | |
| 2006/0138220 A1 | 6/2006 | Persky | |
| 2006/0145927 A1 | 7/2006 | Choi et al. | |
| 2006/0175402 A1 | 8/2006 | Maitin | |
| 2006/0231611 A1 | 10/2006 | Chakiris et al. | |
| 2006/0231616 A1 | 10/2006 | Gibault | |
| 2006/0255941 A1 | 11/2006 | Carrender et al. | |
| 2006/0255945 A1 | 11/2006 | Egbert | |
| 2006/0266824 A1 | 11/2006 | Hassenbuerger | |
| 2006/0278704 A1 | 12/2006 | Saunders et al. | |
| 2006/0289637 A1 | 12/2006 | Brice et al. | |
| 2007/0007338 A1 * | 1/2007 | Pacorich | G01V 15/00 235/385 |
| 2007/0008138 A1 | 1/2007 | Mosher, Jr. et al. | |
| 2007/0034692 A1 | 2/2007 | Johnson | |
| 2007/0061210 A1 | 3/2007 | Chen et al. | |
| 2007/0069011 A1 | 3/2007 | Barton et al. | |
| 2007/0075861 A1 | 4/2007 | Cook et al. | |
| 2007/0102513 A1 | 5/2007 | Scheb | |
| 2007/0114279 A1 | 5/2007 | Lessing et al. | |
| 2007/0124216 A1 | 5/2007 | Lucas | |
| 2007/0126588 A1 | 6/2007 | Mess | |
| 2007/0164868 A1 | 7/2007 | Deavours et al. | |
| 2007/0194993 A1 | 8/2007 | Deavours et al. | |
| 2007/0195003 A1 | 8/2007 | Deavours et al. | |
| 2008/0011836 A1 * | 1/2008 | Adema | G06Q 10/00 235/383 |
| 2008/0024305 A1 | 1/2008 | Deavours | |
| 2008/0058985 A1 * | 3/2008 | Alcov | G07F 7/00 700/234 |
| 2008/0131133 A1 | 6/2008 | Blunt et al. | |
| 2008/0249883 A1 * | 10/2008 | Daily | A47F 9/047 705/23 |
| 2009/0322486 A1 * | 12/2009 | Gerstel | B65G 1/1371 340/10.1 |
| 2012/0075068 A1 * | 3/2012 | Walker | G06Q 10/109 340/10.1 |
| 2012/0080517 A1 * | 4/2012 | Braunstein | G07F 9/026 235/379 |
| 2013/0063008 A1 * | 3/2013 | Martin | G07F 11/00 312/237 |
| 2013/0079037 A1 * | 3/2013 | Dobyns | H04W 4/008 455/456.3 |
| 2014/0180856 A1 * | 6/2014 | Lau | G06Q 20/3278 705/21 |

(56) References Cited

U.S. PATENT DOCUMENTS

2014/0316875 A1* 10/2014 Tkachenko ........... G07F 11/002
                                                                       705/14.25

FOREIGN PATENT DOCUMENTS

| JP | 2001103453 | 4/2001 |
| --- | --- | --- |
| JP | 2001325647 | 11/2001 |
| JP | 2005284671 | 10/2005 |
| JP | 2005301637 | 10/2005 |
| JP | 2008221661 | 9/2008 |
| JP | 2008537825 | 9/2008 |

OTHER PUBLICATIONS http://starportech.com/products/metal_mount_tags.html; Apr. 15, 2010.
Swedberg, Clarie; "University of Kansas' Tag for Metal, Liquids"; RFID Journal, 2 pages; Apr. 19, 2006.
"Agility: Foam Based RFID Tags Can Work With Liquids and Metals"; www.rfid-weblog.com; 5 pages; Jul. 2, 2008.
Bacheldor; "University of Kansas Lab Develops Foam-Attached Tag", RFID Journal, 2 pages; Jun. 24, 2008.
Bacheldor; "New RFID Products for Coping with Metal"; RFID Journal, 2 pages; Jun. 29, 2006.
http://www.idplate.com/rfid-tags-labels/rfid-asset-products/metal-mount-rfid-tag/default.html.
"UHF KU RFID Tag"; University of Kansas Information & Telecommunication Technology Center; 2 pages.
"Agility RFID Technology"; http://www.ittc.ku.edu/agility/.
Wille; Evaluation and Optimization of RFID Transition Control Strategies, Mar. 2005, pp. 1-3.

* cited by examiner

| ITEM DESCRIPTION | COST | QUANTITY | TOTAL |
|---|---|---|---|
| CLEANING SURFACTANT | 2.00 | 5 | 10.00 |
| WIPES | 1.25 | 7 | 8.75 |

MATERIAL COST: $18.75   ALLOCATED TO: PRESS ROOM   BY: R. SMITH

TABLE 300

| ID | UPC | NAME | PRICE | PURCHASE_STATUS | ACCOUNT | RFID | LOCATION | OTHER |
|---|---|---|---|---|---|---|---|---|
| 1 | XX | MILK | 1.50 | NOT SOLD | | 1000 | ON SHELF | 01/01/05 |
| 2 | XX | MILK | 2.00 | NOT SOLD | | 1001 | ON SHELF | 01/03/05 |
| 3 | XX | MILK | 2.00 | NOT SOLD | | 1002 | IN STORE | 01/05/05 |
| 4 | XX | MILK | 2.00 | NOT SOLD | | 1003 | ON SHELF | 01/04/05 |
| 5 | XX | MILK | 1.50 | NOT SOLD | | 1004 | IN STORE | 01/02/05 |
| 6 | XX | MILK | 2.00 | STOLEN | | 1005 | UNKNOWN | 01/08/05 |
| 7 | XX | MILK | 2.00 | SOLD | | 1006 | OUT OF STORE | 01/09/05 |
| 8 | XX | MILK | 2.00 | ALLOCATED | 5000 | 1007 | OUT OF STORE | 01/06/05 |

FIG. 16

Store

Welcome, John!
Your account balance is low. Please charge up your account.

First Name: John
Last Name: Doe
Email Address: JohnDoe@johndoe.com
Mobile #: 5551234567

Balance: $3.25

[ Cancel ]

Select an amount to add to your account and
swipe your credit card when you are ready Amounts Greyed out will not add enough to patron balance to access machine.

SECURE SELF-CHECKOUT STATION

CROSS REFERENCE TO RELATED APPLICATIONS

This application is a continuation of U.S. patent application Ser. No. 13/963,896, filed Aug. 9, 2013, which is a continuation-in-part of U.S. patent application Ser. No. 13/683,983, filed Nov. 21, 2012, which is a continuation of U.S. patent application Ser. No. 13/488,202, filed Jun. 4, 2012, which is a continuation of U.S. patent application Ser. No. 11/910,436, filed Jun. 13, 2008, now U.S. Pat. No. 8,191,780, which is a 371 Application of PCT/US2005/047149 filed Dec. 27, 2005, which claims the benefit and priority of U.S. Provisional Application Ser. No. 60/669,183, filed Apr. 7, 2005.

FIELD

This invention relates to a self-checkout kiosk that enables a patron to purchase or checkout a product without the presence of a checkout attendant. The kiosk incorporates a retail security system that can be used separately in conventional retail environments to reduce shrinkage. As used herein, the term "kiosk" means any area in which product is stored and displayed and which includes a self-checkout station permitting a patron to complete a purchase transaction and a portal incorporating a security system, and the term "tag" means both tags that are separately applied to a product as well as tags that are an integral part of the product or are integral with packaging. The self-checkout station may be adjacent to and/or integral with the portal, or may be located within the kiosk separate from the portal.

BACKGROUND OF THE INVENTION

Self-checkout point of sale (POS) systems are well known in the art. One example of such a system is found in grocery stores having self-checkout lanes. A POS typically includes a terminal, bar code reader, a computer, and POS software. The patron scans products using a bar code reader. The computer communicates with the patron via the POS software when the bar code reader has been successfully used to read the Universal Product Code (UPC) and then transmits the UPC information to a host server, which processes the UPC information by comparing it to a database. The database typically includes information such as number of units in stock, price per unit, and any other information which may facilitate the transaction in addition to the UPC.

Such an automated sales system has obvious limitations including, by way of example, the lack of security measures working in concert with the system. All sales must be monitored by an attendant to insure that the patron has presented each merchandise item to the bar code scanner. The requirement for an attendant to monitor the sales limits the number of sales terminals that may be operated, as it is not cost effective to have an attendant monitoring such a terminal during periods of low sales volumes. Accordingly, there is a need for an automated shopping system with a security system that avoids the need for an attendant to be present to monitor all transactions which may take less time to consummate the transaction. Additionally, in conventional retail environments in which one or more attendants are present, enhanced security measures are desirable to reduce product shrinkage.

Recently, inventory control systems using Radio Frequency Identification (RFID) systems have become available for inventory control. Unlike bar code systems, in which the bar code must be directly displayed to the bar code reader, RFID systems use radio waves to read a tag anywhere within the field generated by the reader, regardless of the orientation of a particular tag.

SUMMARY OF THE INVENTION

The present invention relates to an unattended checkout system. The system includes a cabinet having a doorway and walls defining a vending space. The system also includes a door having a lock and attached to the cabinet, the door configured to close over the doorway to enclose the vending space. The system also includes at least one product configured for placement in the vending space and located in the vending space. The system also includes a radio frequency identification (RFID) tag attached to the at least one product. The system also includes an RFID reader adjacent the door and configured to read product data from the RFID tag and detect if the at least one product passed through the doorway. The system also includes a database configured to store an inventory of products located in the vending space and products previously in the vending space which are currently allocated to an account. The system also includes a self-checkout apparatus connected to the database. The self-checkout apparatus is configured to unlock the lock when valid account credentials associated with an account are detected. The self-checkout apparatus is also configured to update a checkout list to include the at least one product after the at least one product passed from the vending space and through the doorway. The self-checkout apparatus is also configured to present a confirmation display of the checkout list. The self-checkout apparatus is also configured to allocate all products in the checkout list to the account associated with the account credentials upon receiving a confirmation indication.

In another implementation, the system includes a room having an entryway and walls defining a vending space. The system also includes a barrier having a lock and attached to the entryway, the barrier configured to restrict access to the vending space. The system also includes at least one product configured for placement in the vending space and located in the vending space. The system also includes a radio frequency identification (RFID) tag attached to the at least one product. The system also includes an RFID reader adjacent the entryway and configured to read product data from the RFID tag and detect when the at least one product passes through the entryway. The system also includes a database configured to store an inventory of products located in the vending space and products previously in the vending space which are currently allocated to an account. The system also includes a self-checkout apparatus connected to the database. The self-checkout apparatus is configured to unlock the lock when valid account credentials associated with an account are detected. The self-checkout apparatus is also configured to update a checkout list to include the at least one product after the at least one product passes from the vending space and through the entryway. The self-checkout apparatus is also configured to present a confirmation display of the checkout list. The self-checkout apparatus is also configured to allocate all products in the checkout list to the account associated with the account credentials upon receiving a confirmation indication.

A method for allocating products is also disclosed. The method includes receiving account credentials on a self-checkout apparatus. The method also includes automatically unlocking a lock of a door to an enclosed vending space when the account credentials are valid, the enclosed vending space housing a product having a radio frequency identification (RFID) tag. The method also includes detecting, using an RFID reader adjacent to the door, the product leaving the enclosed vending space. The method also includes updating a checkout list to include the product after the product leaves the enclosed vending space. The method also includes presenting a confirmation display of the checkout list. The method also includes allocating each product in the checkout list to the account associated with the account credentials upon receiving a confirmation indication.

BRIEF DESCRIPTION OF THE DRAWINGS

FIG. 16 is a table of database records used by the POS software;

FIG. 20 is a screen view of a self-checkout station depicting options to add funds to an account according to an implementation of the present disclosure.

DETAILED DESCRIPTION

Figure 1:
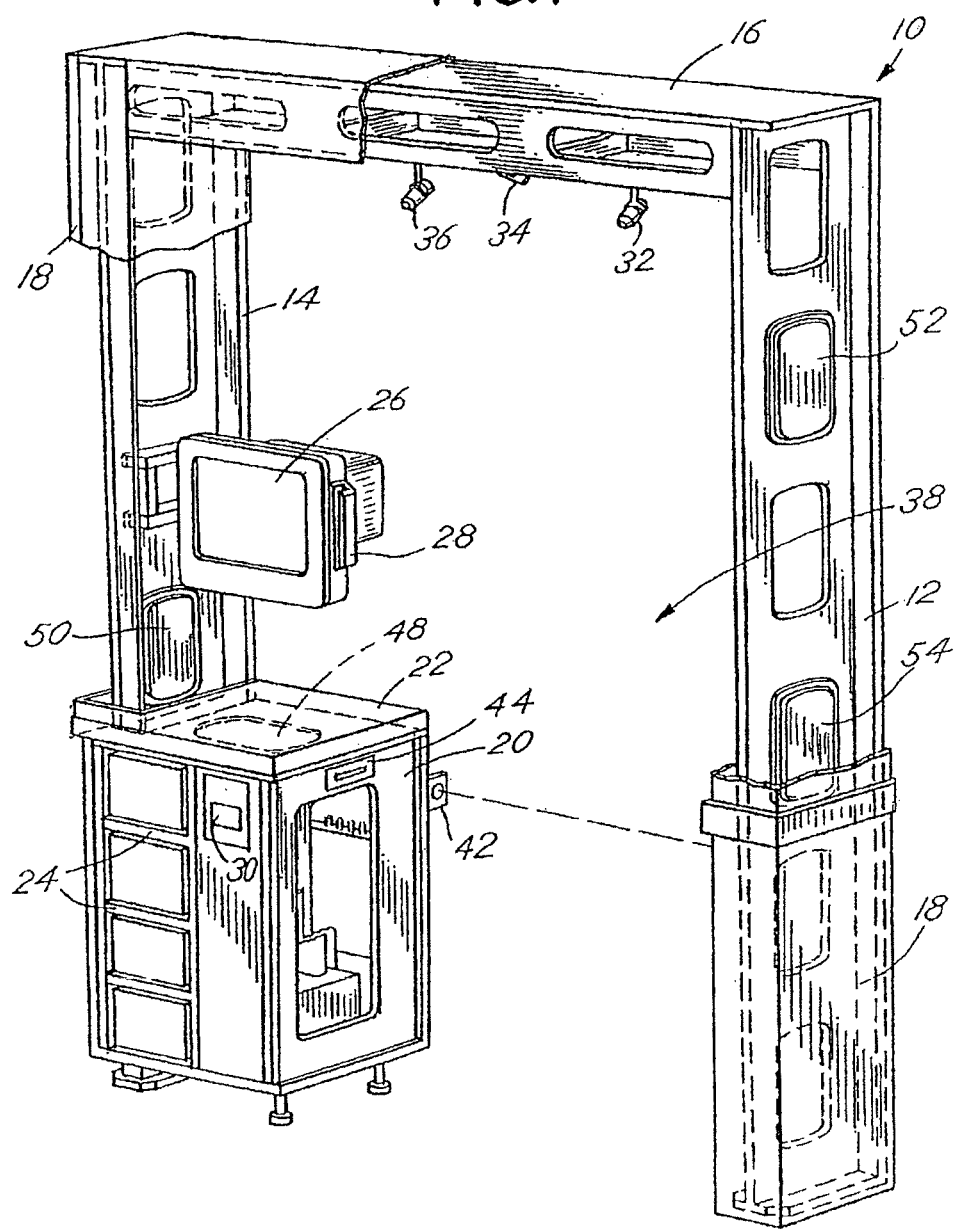
FIG. 1 is a view in perspective of a self-checkout kiosk made pursuant to the teachings of the present invention.
Figure 2:
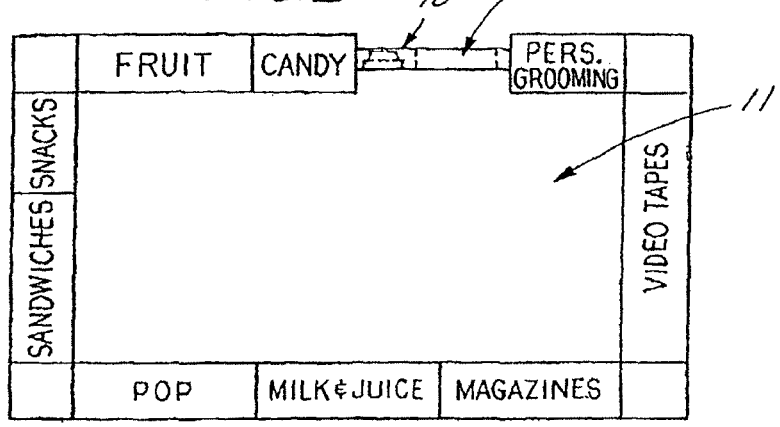
FIG. 2 is a top plan view of a vending area of the kiosk as illustrated in FIG. 1.

Referring now to FIGS. 1 and 2, a kiosk made according to the present invention illustrated generally by the numeral 10. The kiosk 10 is intended for use in institutions where availability of product on a twenty-four hour, seven day a week basis is desired. Typical applications include hotels, college dormitories, etc. As shown in FIG. 2, the kiosk 10 includes a portal defining the entrance into, or egress from, a vending area generally indicated by the numeral 11. As illustrated, multiple products, each tagged with a Radio Frequency Identification (RFID) tag, are displayed for purchase in the vending area 11. As illustrated, such products may include soft drinks, snacks, sandwiches, video tapes, and other products. According to the invention, a patron enters the vending area 11 through the portal, selects from one or more of the products displayed, and then exits through the portal after completing a self-checkout transaction at a self-checkout station as will be hereinafter explained. As will also be explained, various security measures inhibit a patron from removing products from the vending area without completing a self-checkout transaction, which includes payment for the items or allocating the items to an account.

The portal is defined by a pair of facing, substantially parallel side frame members 12 and 14, which are connected by an upper transverse frame member 16. The frame members 12, 14 and 16 are made of any suitable material, such as wood or particle board, and are covered by a decorative covering 18 made of any material which allows passage of radio frequency waves, particularly waves at a frequency of 915 MHz. Typical materials of the covering 18 include plastic and plywood with a laminate finish. Although only one portal is illustrated, multiple portals may be used to provide entry into and egress from the vending area. The side frame member 14 terminates at a counter 20, which includes an upper surface or tray 22 upon which product being purchased may be placed, as will hereinafter be explained.

The counter 20 provides a locked area for placement of an RFID reader, a DVD recorder, a computer, and a router, all of which will be hereinafter explicitly identified and explained. A touch screen computer monitor 26 is mounted on the side frame member 14 and projects above the tray 22 where it is easily accessible to a patron completing a transaction. A conventional card reading swipe 28 is mounted on the edge of the monitor 26, which is used to read credit cards and other cards which may be used to process a purchase transaction. A conventional receipt printer 44 is mounted adjacent the tray and/or monitor for printing a receipt confirming a purchase transaction. A conventional bill acceptor 30 available commercially as a ValTech bill acceptor, is mounted on the counter 20 to accept currency to be used in payment for product. A conventional microphone and speaker enable a patron to communicate with an attendant at a remote location. While the kiosk of the invention does not require the presence of an attendant on site, it permits communication with an attendant at a remote location, who is able to supervise several self-checkout kiosks. Together, the counter 20, touch screen computer monitor 26, card reading swipe 28, receipt printer 44 and bill acceptor 30 define a self-checkout station that permits a customer to complete a transaction. A customer may purchase products or may allocate products to an account, as will be explained.

Figure 8:
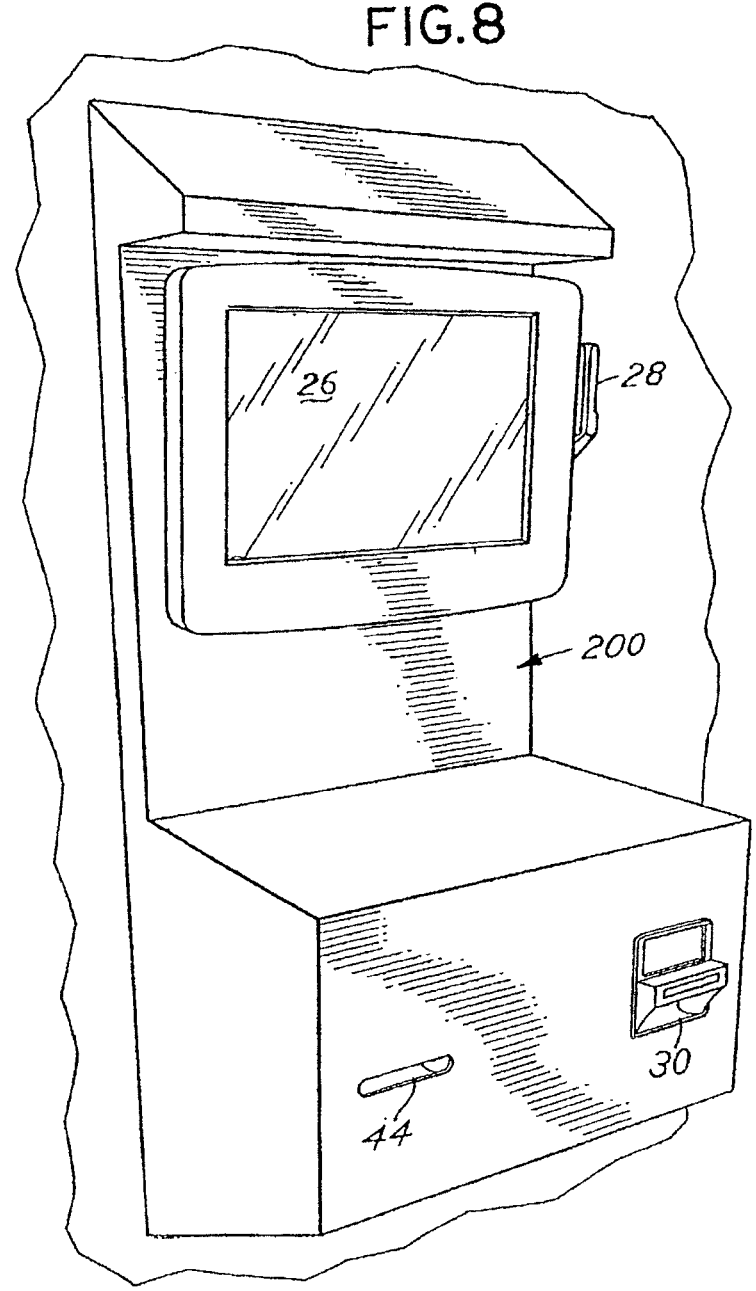
FIG. 8 is a view in perspective of a self-checkout station used in an alternate implementation of the kiosk illustrated in FIG. 1.

Although the self-checkout station is illustrated in the implementation of FIG. 1 as being integral with the portal, it will be understood that the self-checkout station may be separated from the portal, and may be located anywhere within the vending area. For example, and referring to FIG. 8, a self-checkout station generally indicated at 200 is illustrated as being mounted on a wall within the vending area 11 and is separate from the portal (not shown).

Figure 14:
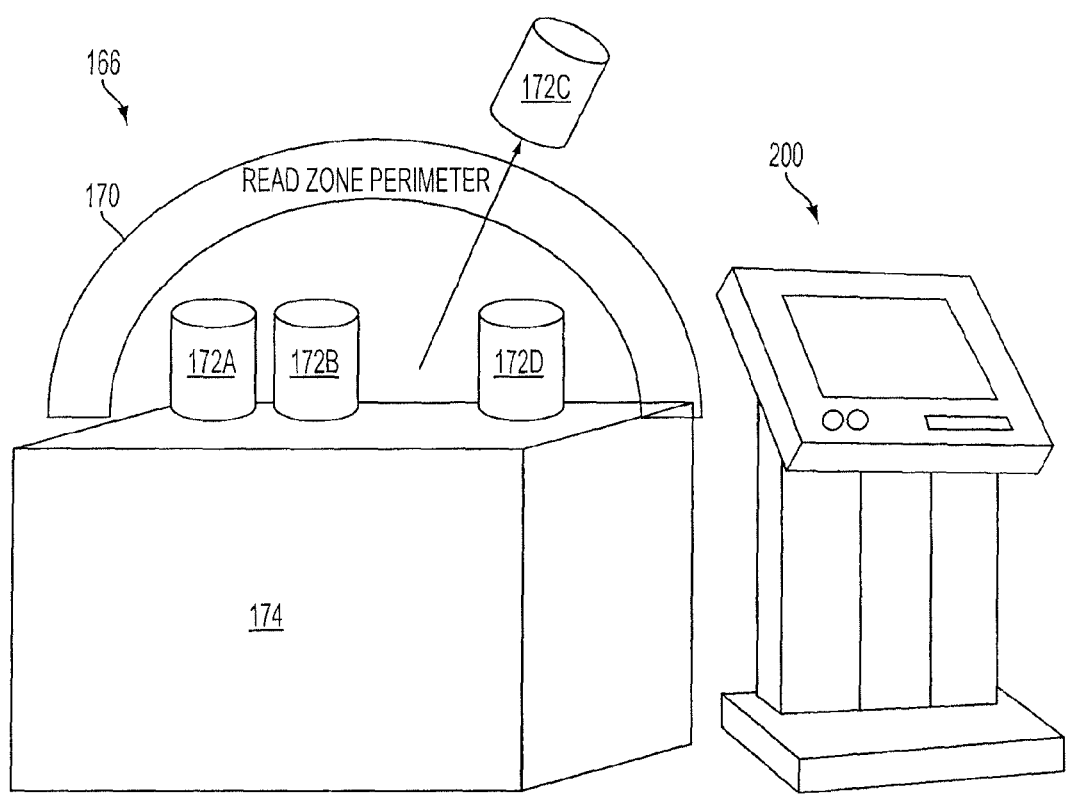
FIG. 14 is a view of a smart shelf in a self-checkout process.

Although the self-checkout station 200 is shown as being mounted on the wall, it could be mounted on a counter, pedestal or similar support within the vending area 11. FIG. 14 depicts self-checkout station 200 mounted on a pedestal.

Figure 11:
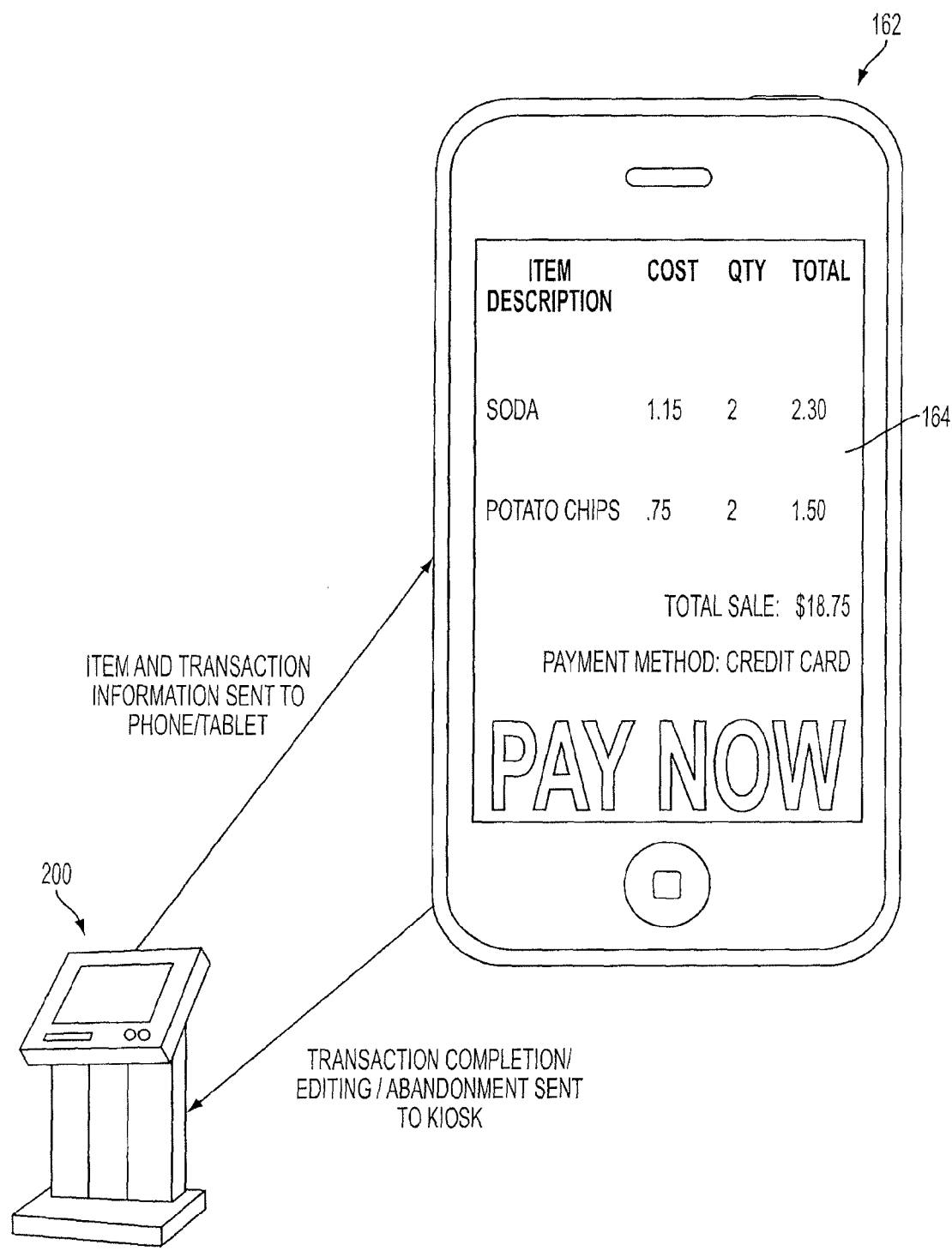
FIG. 11 is a view of a mobile device paired with a self-checkout station.

A transaction on self-checkout station 200 may also be conducted on a mobile device, such as a smartphone or tablet. The mobile device may be the property of the vendor or the customer. A QR code or Near Field Communication (NFC) tag can be used to conveniently pair the mobile device with self-checkout station 200. For example, FIG. 11 shows smartphone 162 paired with self-checkout station 200. To facilitate and accelerate communication, which may include downloading a self-checkout application onto smartphone 162, between self-checkout station 200 and smartphone 162, self-checkout 200 has a pairing mechanism. The pairing mechanism includes an RFID tag (not shown) or other NFC tag readable by smartphone 162. Alternatively, or in addition to the RFID tag, self-checkout station 200 displays machine readable codes, such as barcodes or QR codes.

Figures 9, 10:
FIG. 9 is a screen view of a self-checkout station depicting an allocate to account option.
FIG. 10 is a screen view of a self-checkout station depicting options for pairing with a mobile device.

FIG. 10 illustrates a mobile pairing screen 156. Mobile pairing screen 156 displays QR code 160, readable by a camera or other optical scanner on smartphone 162. Mobile pairing screen 156 also displays pairing button 158, a virtual button displayed on touch screen computer monitor 26 to initiate mobile pairing. The pairing designates smartphone 162 as the recipient of the item self-checkout information. Once paired, smartphone 162 displays a self-checkout screen, as seen in FIG. 11. The self-checkout screen may be the same as displayed by touch screen computer monitor 26, or as in FIG. 11 is optimized for display on smartphone 162. The self-checkout screen allows for payment or allocation to an account, similar to self-checkout station 200. When the customer completes a transaction on smartphone 162, smartphone 162 communicates the transaction information to self-checkout station 200. In alternative implementations, the item self-checkout information is sent to smartphone 162 instead of displayed on touch screen computer monitor 26, obviating the need for touch screen computer monitor 26.

Turning back to the portal, conventional security cameras 32, 34, and 36 are mounted on the uprights 12, 14, and 16. Security camera 34 is focused on the patron standing near the monitor 26, and cameras 32 and 36 are trained on the vending area 11 and or the areas adjacent the kiosk 10. The uprights 12, 14, and 16 and the counter 20 cooperate to define a portal 38 through which a patron must leave the vending area 11. The cameras 32, 24, and 26 are aimed to photograph anyone in the vending area 11, and any patron leaving through the portal 38. Each of the cameras is connected to a conventional DVD recorder 40 which may be located within the cabinet 20. A fourth camera (not shown) may be aimed at the monitor. The cameras and DVD recorder are components of a security system available commercially from Everfocus as Everfocus DVSR-400. A conventional motion sensor, such as photoelectric motion sensor 42, which projects a photoelectric beam across the portal 38 and which generates a signal communicated to the computer when the beam is broken, is mounted on the kiosk 10 and projects the beam across the portal 38 to detect movement of a patron through the portal 38. Electronic signage (not shown) is mounted on the frame member 16 on the edge thereof facing away from the vending area 11. A receipt printer 44, such as is available from Swecoin, is also mounted adjacent the counter 22. The receipt printer, bill acceptor, card swipe, the DVD component of the security system, and the RFID reader discussed below are all connected to the computer.

As discussed above, all products available in the vending area 11 bearing RFID tags. The tags may be a 96 bit Lepton chip read many, write once class 1 type tag. The tags are read by a reader, which is well known in the art, such as an Alien Technology Model ALR 9780 indicated at 46 (FIG. 6), and operating at 915 MHz. The RFID reader is stored within the cabinet 20, and is connected via appropriate cables to four circular polarized 915 MHz antennas 48, 50, 52, and 54. Antenna 48 is mounted in counter 20 immediately below the tray 22 with its polarization facing upwards toward the tray. Although only a single RFID reader is illustrated, it will be understood that multiple RFID readers may be desirable or necessary if the self-checkout station is separate from the portal and located at a distance there from that it is desirable that a separate RFID reader be used to be used only for the RFID antenna at the self-checkout station and a separate RFID reader be used for the antennas providing security at the portal. Of course, if multiple portals are used, it may be desirable to use RFID readers to accommodate each portal.

Figure 3:
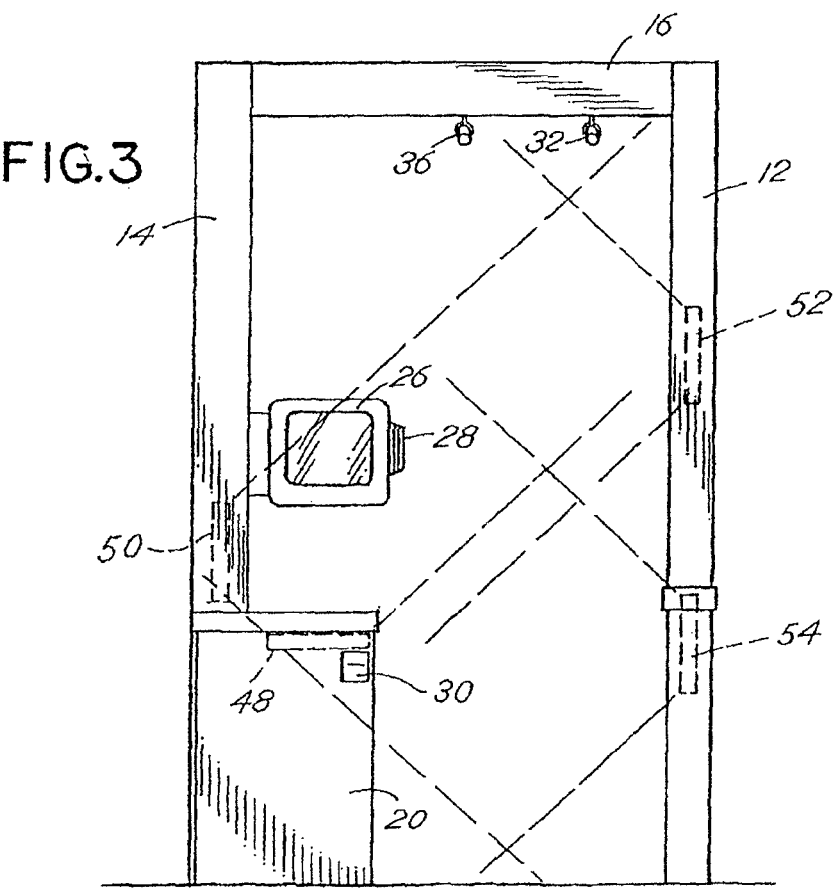
FIG. 3 is a side elevation view of the kiosk illustrated in FIG. 1.

In this implementation, the RFID readers operate in "detect mode." In "detect mode," the self-checkout process is activated when an RFID tag is read. The RFID readers each would be connected to the computer. The antenna 50 is mounted in side frame member 14 perpendicular to the antenna 48 and with its polarization facing into the portal 38. Antennas 48 and 50 provide the strongest tag detection when the vended product is placed on the tray. Antennas 52 and 54 are mounted in the side frame member 12, with approximately even spacing between the antennas 52 and 54, between the antenna 52 and the transverse frame member 16, and between the antenna 54 and the floor. Both antennas 52 and 54 have their polarizations facing into the portal 38. Each of the antennas 48-54 is identical, and each is substantially flat panels with rounded ends and straight sides between the rounded ends. The circular polarizing results in a curtain of radio frequency waves radiating at a 45 degree angle from the circular ends. Accordingly, as illustrated in FIG. 3 the radio frequency curtains radiated by each of the antennas 48-54 overlap to form a curtain across the entire portal 38, so that any attempt to move product through the portal will result in the RFID tag on the product being read.

Figure 6:
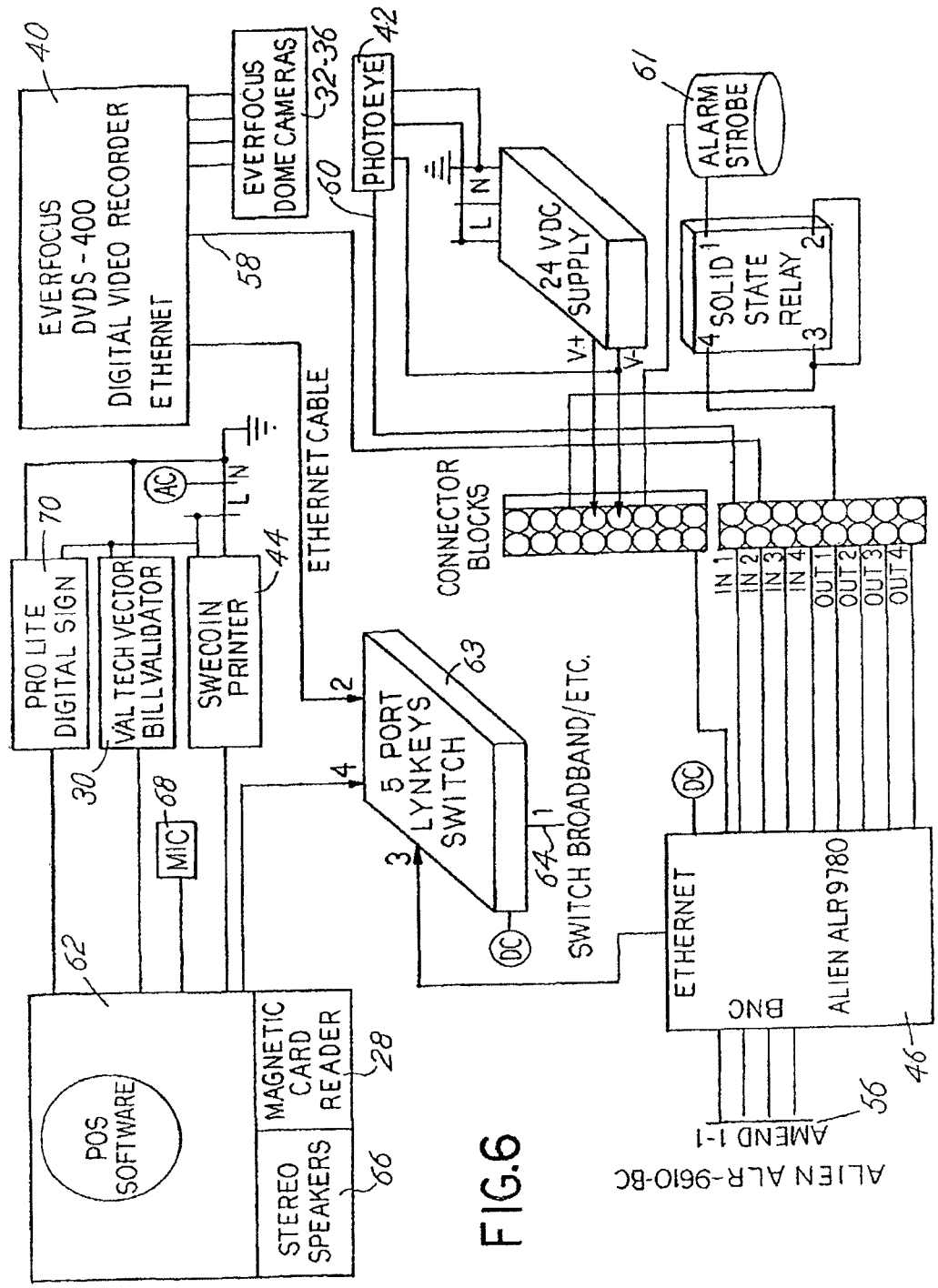
FIG. 6 is a block diagram illustrating the components of the present invention and their interconnections.

Referring now to FIG. 6, the RFID reader 46 includes multiple input ports 56, each of which is respectively connected to a corresponding one of the antennas 48-54, and has additional inputs connected to the output 58 of the DVD recorder 40, and to the sensing output 60 of the photo eye 42. Reader 46 also has outputs connected, through the appropriate relays, to an alarm or strobe light 61. An Ethernet port connects the reader 46 to a router, such as a Linksys router, the other ports of which are connected to Ethernet ports on the DVD recorder 40 and on the personal computer. The router 63 includes a port which is connected via a broadband connection to a remote computer.

Through a voice-over-internet protocol, the remote attendant may talk to a patron using the kiosk 10, but the attendant at a main kiosk can also handle several other remote, non-attended kiosks. It is also contemplated that a local inventory will be maintained on the computer 62, but through the router 63 and the broadband connection the local inventory will be updated by a master inventory at a remote location or main kiosk for inventory maintenance. The local inventory can also be updated by the remote computer to update for new inventory, restocking, etc. The computer 62 is also connected to speakers 66 and microphone 68, to provide the aforementioned communication between the patron using the kiosk 10 and the remote attendant, and further includes a driver for the digital sign and has ports connected to the receipt printer 44 and the bill/coin validator/acceptor 30.

A database manages the local inventory. The database may be stored on computer 62 or may be stored at a remote location, accessible through router 63 and the broadband connection. The database assigns a unique identification code for each individual product having its own RFID tag. The database associates the unique identification code to the product data stored in the product's corresponding RFID tag. Rather than storing a count of each type of product, the database stores each individual product as its own record. In the example shown in FIG. 16, the database stores a record for each individual milk carton, instead of storing a milk carton having a count of 4.

Referring to FIG. 16, table 300 is disclosed, showing the records stored in the database that are associated with milk cartons. Each individual product is given a unique ID within the table, along with other data. For example, the database can store a PURCHASE_STATUS, such as Not Sold, Sold, Allocated, Stolen, or Missing. The database further stores a UPC code, a NAME, a PRICE, and an RFID tag identifier, which corresponds to the product's RFID tag. Storing a record for each individual product allows the database to store additional data associated with each product. The ACCOUNT column stores the account to which the product is allocated or checked out. The LOCATION column may store specific locations, such as "on shelf," or more general locations, such as "in store" or "unknown," depending on the placement and availability of RFID readers and RFID antennas. In table 300, the OTHER column refers to an expiration date for the milk, but may also store other data.

The increased level of data stored with each individual product provides the vendor with additional dynamic inventory management options. In table 300, the expiration dates of the milk cartons stored in OTHER may allow the vendor to not sell (by removing from the database) milk cartons which have expired. The vendor may further elect to discount the prices of milk cartons whose expiration dates are nearing.

Figure 7:
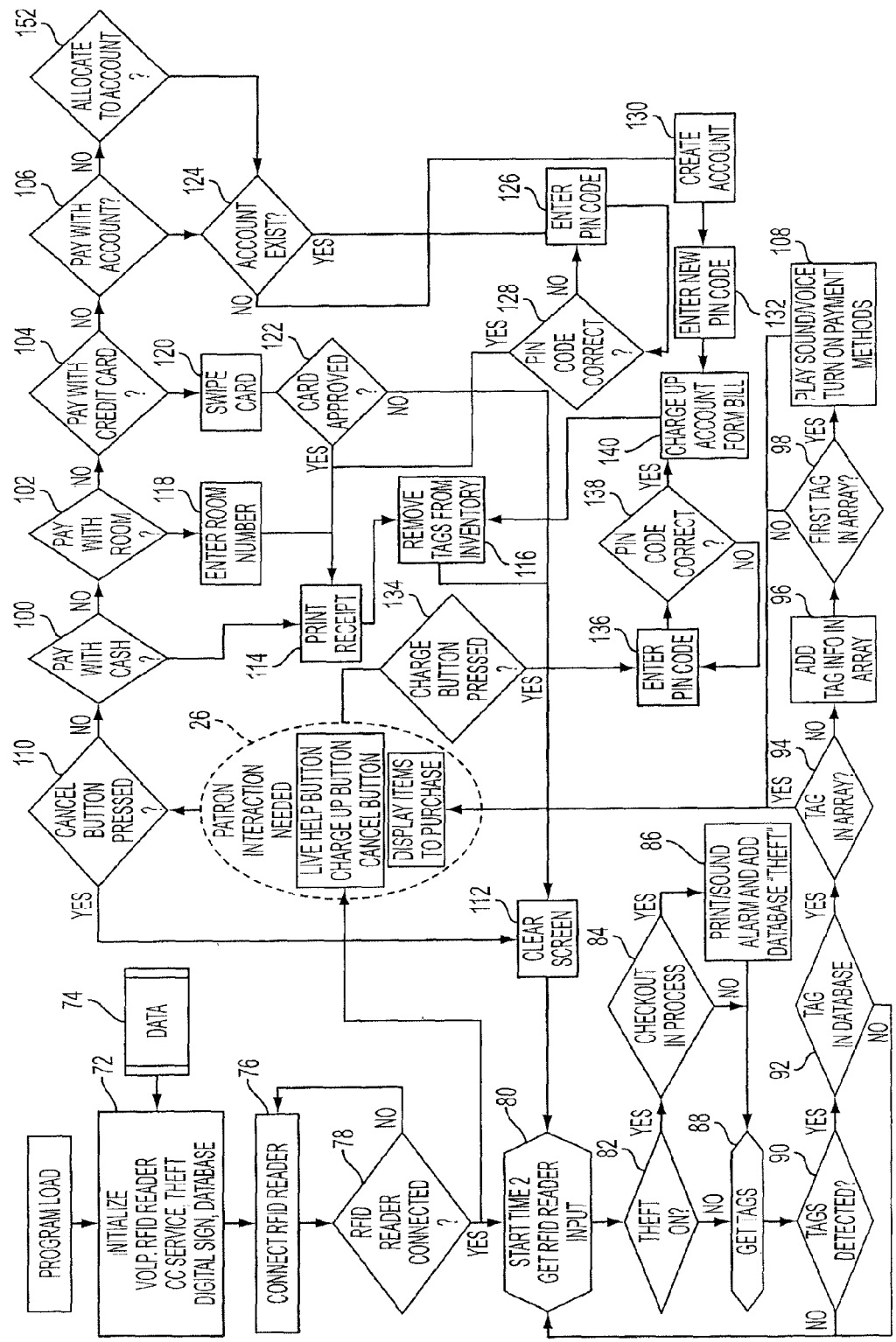
FIG. 7 is a diagrammatic flow chart of the Point of Sale (POS) software used in the present invention.

Referring now to FIG. 7, a flow chart of the software is disclosed, which is a compilation of the software included within the computer 62 and tag reader 46. Upon the kiosk 10 being available to patrons, the remote computer signals computer 62 to initialize the systems components, as indicated at 72. At that time, the computer 62 reads inventory data from the main terminal as indicated at 74. The RFID reader or readers are then activated, as indicated at 76, a test is made at 78 to assure that the RFID reader or readers have been connected, upon which the help button, charge up button, and cancel button on the monitor are activated and the items to purchase display is also activated. At that time a timer is started and a tag is read, as at 80. A test is made at 82 and 84, to determine if the beam generated by the photoelectric eye has been broken while one or more tags have been sensed, that have not been marked in the database as being sold, at which time an alarm is sounded and the inventory database is marked for the theft, as indicted at 86. The DVD recorder is also signaled into an enhanced recording mode, so that the images from the cameras are recorded at 60 frames per second, instead of the normal five frames per second.

If a theft has not been flagged at 82, and a tag is detected at 88 and 90, a test is made to determine if the tag is in the database as at 92 so that pricing can be established and the item and price is added to the array (if not already displayed) on the monitor 26 and/or smartphone 162, as indicated at 94 and 96. If the tag is the first tag in the array, as determined at 98, payment option buttons 100, 102, 104, and 106 are turned on and displayed on the monitor, as indicated at 108, along with a voice prompt requesting the patron to select a payment method or account to allocate to. The cancel button 110 is always displayed, which permits the patron to cancel the transaction at any time, upon which the screen is cleared as indicated at 112. If the patron elects to pay with cash by selecting that option at 100, a receipt is printed as indicated at 114, the item is removed from the inventory record as indicated at 116 and marked as "sold," and the screen cleared as indicated at 112, after, of course deposit of a sufficient amount of currency in the bill acceptor is confirmed. If the patron elects to pay by charging the purchase to a hotel room by choosing 102, the patron is asked to enter the room number on the keypad as indicated at 118, after which the transaction is completed by printing a receipt, removing the items purchased from the inventory record as being sold, and clearing the screen as discussed above. If the patron elects to pay by credit card by selecting that option at 104, the patron is requested to swipe the card as indicated at 120 and the normal card verification procedures over the broadband connection through the router 63 are completed, as indicated at 122. Upon card approval, the transaction is completed by printing the receipt, removing the item from inventory, and clearing the screen. If the card is not approved, the patron is so informed on the monitor screen, and the transaction is aborted and the screen cleared.

The patron may also elect to pay by using a charge-up card by choosing that option at 106. Charge-up cards are particularly useful in situations such as college dormitories, where repeated purchases are expected. This option allows the patron to "charge up" a card at one visit and use credits remaining on the card for subsequent visits. If option 106 is selected, a test is made at 124 to determine if a current account with sufficient credits exists for the card being used. If so, the patron is requested to enter the corresponding PIN number as indicated at 126, which is confirmed at 128. If the PIN number is correct, the transaction is completed by printing a receipt, removing the item from inventory as being sold, and clearing the screen; if the PIN number is incorrect, the patron is requested to re-enter the PIN number. If an account does not exist, the patron is asked to enter the information necessary to establish the account on the keyboard as indicated at 130, and the patron is asked to enter a new desired PIN number on the keyboard at 132, upon which the account must be charged up. A new account may be charged up, or the credits on an existing account increased, by pushing the "charge up" button on the monitor screen, as indicated at 134. The patron will then be prompted to deposit currency to charge up the account and to enter the PIN number at 136 (the PIN number may be the same as the PIN number just entered at 132 if a new account is being established), the account is charged up and a bill/receipt formed as indicated at 140, at which time the transaction is completed by clearing the screen.

Additionally, the patron may choose to allocate the items to an account by choosing that option at 152. As seen in FIG. 9, the patron may be prompted by allocate screen 154 to select an account. Accounts may be denoted as departments, projects, or other identifiers, such as a room number seen in FIG. 9. Similar to paying with an account, a test is made at 124 to verify the account exists. Allocating to an account further creates an association between the items and the account within the database, as discussed above. Moreover, allocation to an account allows for non-sales transaction. Rather than purchasing the items, the items may be checked out to the account, such as a lamp being checked out by a dorm room. Otherwise, the transaction may be completed similar to paying with an account, as described above.

Although the kiosk 10 has been described as including both a self-checkout station and a portal incorporating security measures, the portal itself may be used in conventional retail environments to control inventory shrinkage. For example, in traditional retailers having attended checkout lanes, one or more of the security portals as described herein may be installed where customers, after proceeding through the checkout lanes (whether attended or unattended) must pass through one of the portals before exiting the retailer. When the customer proceeds through checkout, each of the products purchased are removed from the inventory database maintained by the store and marked "sold." When the RFID reader associated with the antennas mounted on the portal sense transfer of product through the portal that has not been marked sold, appropriate security alarms are initiated.

Figure 4:
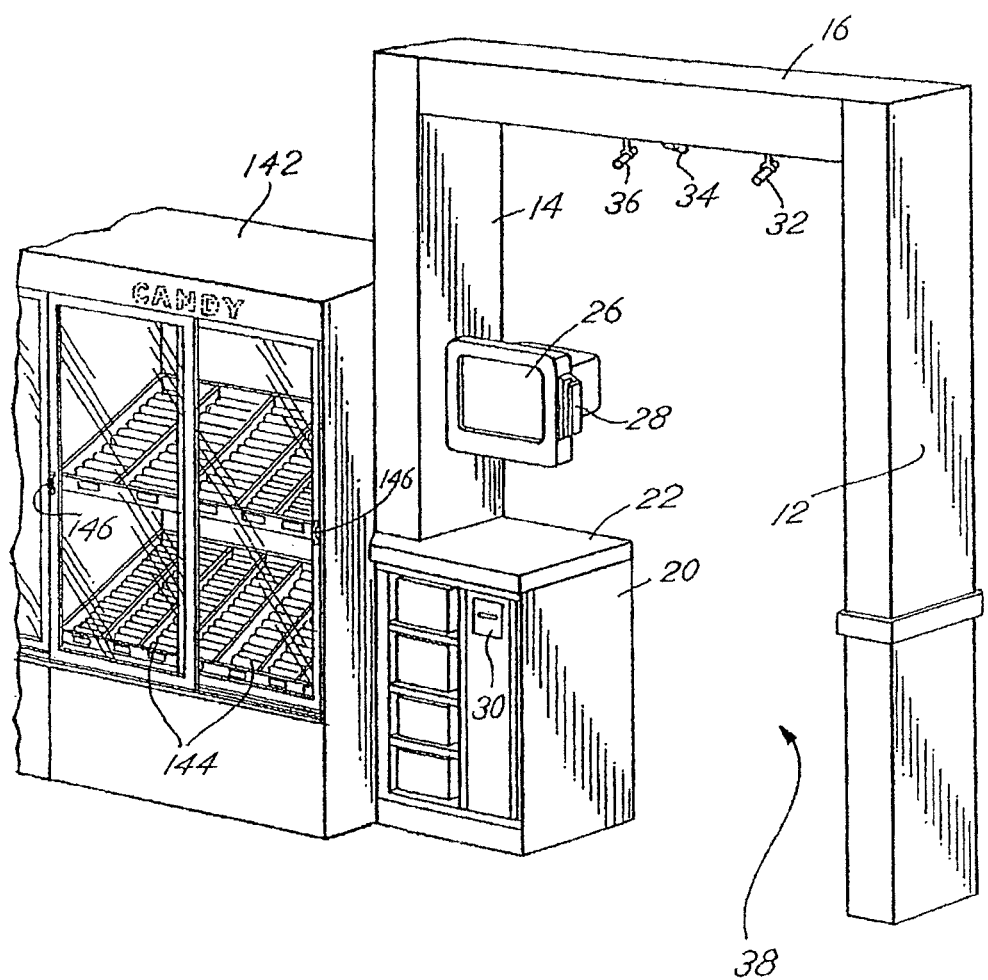
FIG. 4 is a view similar to FIG. 1 but illustrating another implementation of the invention.
Figure 5:
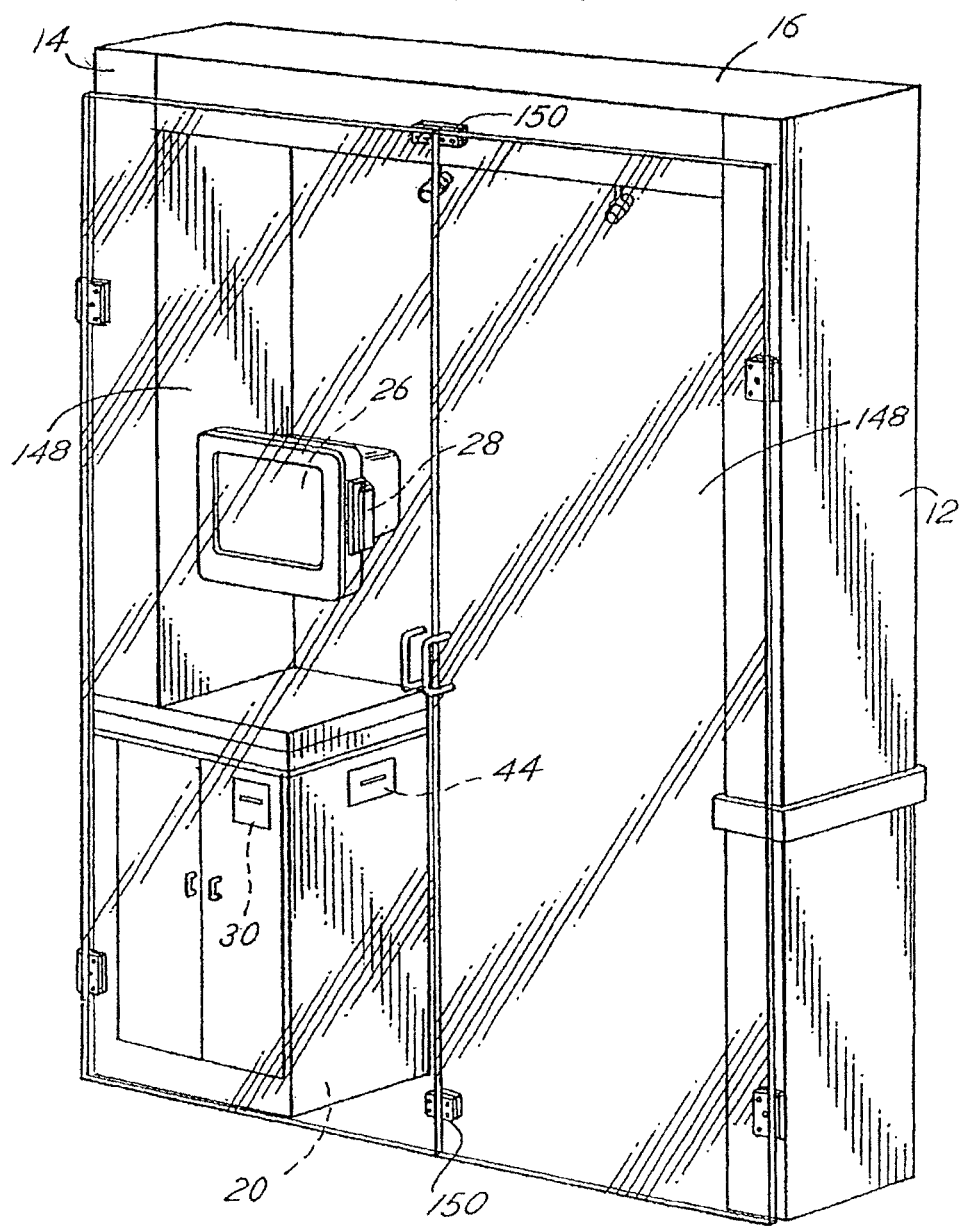
FIG. 5 is a view similar to FIGS. 1 and 4, but illustrating still another implementation of the present invention.

The kiosk described above provides a minimum level of security. If an enhanced level of security is desired, the various display cases within the vending area 11, such as the candy display case 142 in FIG. 4, is enclosed and provided with sliding doors 144 equipped with magnetically released locks as at 146. Before product is made available, the patron must swipe a credit card (or charge-up card) to unlock the doors of the display cases. Accordingly, an indication of the patron's identity can be retained. If a still greater level of security is desired, doors, such as the transparent doors 148 in FIG. 5, are mounted on the side frame members 12 and 14 via hinges. The doors close the portal 38, and are mounted on the edges of the side frame members that face into the vending area 11. The doors are latched with magnetically released locks 150. Since the doors extend across the inside of the kiosk 10, the monitor 26 and card swipe 28 are outside of the doors and are available to a patron. In order to unlock the doors and enter into the vending area, the patron must swipe a credit card (or a charge-up card) in the card swipe 28. Accordingly, before the patron even enters the vending area, an indication of the patron's identity is retained.

Figure 12:
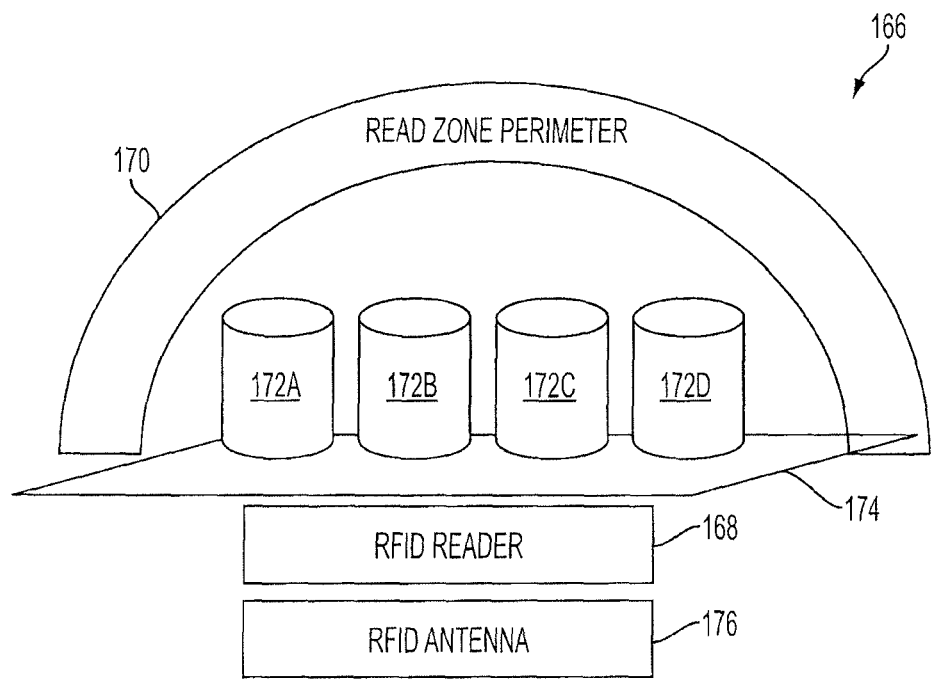
FIG. 12 is a view of a smart shelf in a resting state according to the present inventive concepts.

The implementations described above operate in "detect mode." However, in an alternative implementation, the need for a security gate, such as portal 38, may be obviated by the use of a "smart shelf." Whereas in "detect mode," the software of self-checkout station 200 becomes active when an RFID tag is read, the software of the smart shelf detects when an RFID tag is not read. FIG. 12 presents one implementation of smart shelf 166. Smart shelf 166 comprises merchandise fixture 174, which may be a shelf, display case, or other fixture which displays products for sale or allocation. The products may include products 172A, 172B, 172C, and 172D (also collectively referred to as "products 172A-D"). Similar to the products described above, products 172A-D each bear an RFID tag to uniquely identify each product 172A-D.

Figure 13:
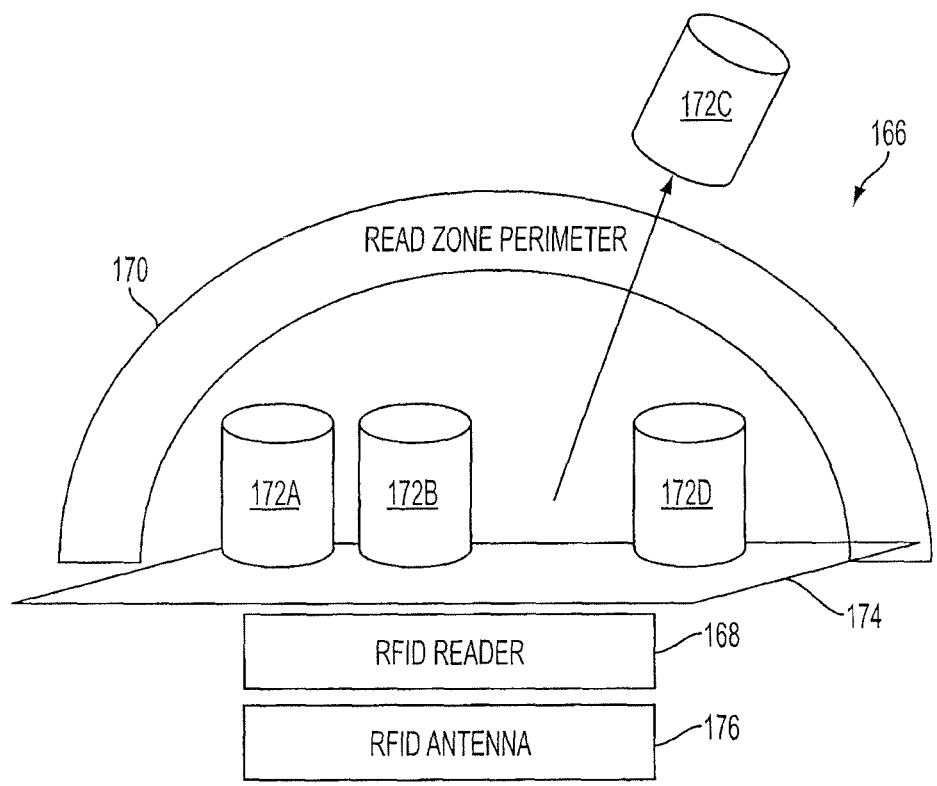
FIG. 13 is a view of a smart shelf detecting a removed product.

In order to detect products 172A-D, merchandise fixture 174 is integrated with RFID reader 168 and RFID antenna 176 (not shown to scale in FIGS. 12 and 13). RFID antenna 176 has a limited read range, depicted as read zone perimeter 170. The read range of read zone perimeter 170 may be appropriate for the size, shape, and location of merchandise fixture 174. For instance, a small shelf containing small products would have a smaller read zone perimeter than a large shelf holding large products. During a normal, or resting state, smart shelf 166 constantly reads and verifies RFID tags. In FIG. 12, smart shelf 166 expects products 172A-D to be within read zone perimeter 170. Smart shelf 166 provides real time tracking of products. Smart shelf 166 may further be utilized to organize products by smart shelves. For example, a small smart shelf may hold printer cartridges and an adjacent large smart shelf may hold printers. If a printer cartridge was left on the large smart shelf, the small smart shelf may detect that the printer cartridge was missing, the large smart shelf may detect the printer cartridge which does not belong, and together the small and large smart shelves may alert the vendor about the misplaced printer cartridge.

Returning to FIG. 12, smart shelf 166 detects products 172A-D. In FIG. 13, a customer has removed product 172C from smart shelf 166. Because product 172C is outside of read zone perimeter 170, smart shelf 166 no longer detects product 172C, which starts the self-checkout process for product 172C, similar to the self-checkout process described above. Product 172C and any additional items that are no longer detected are added to the checkout tally. However, if product 172C is not returned to read zone perimeter 170 or purchased/allocated within a user-defined set of time, product 172C is flagged as a theft.

Because smart shelf 166 has already added product 172C to the checkout tally, self-checkout station 200 does not require its own RFID reader. As seen in FIG. 14, a customer may complete the self-checkout process on self-checkout station 200 not having tray 22. Self-checkout station 200 may be placed near smart shelf 166. In addition, a mobile device such as smartphone 162 may pair with self-checkout station 200. Moreover, smart shelf 166 may be integrated with computer 62 such that self-checkout station 200 is not necessary. Smartphone 162 may instead pair with smart shelf 166. A customer may then remove product 172C from smart shelf 166, and complete the transaction on smartphone 162 before leaving the vending area, without having to stop at self-checkout station 200.

Figure 15:
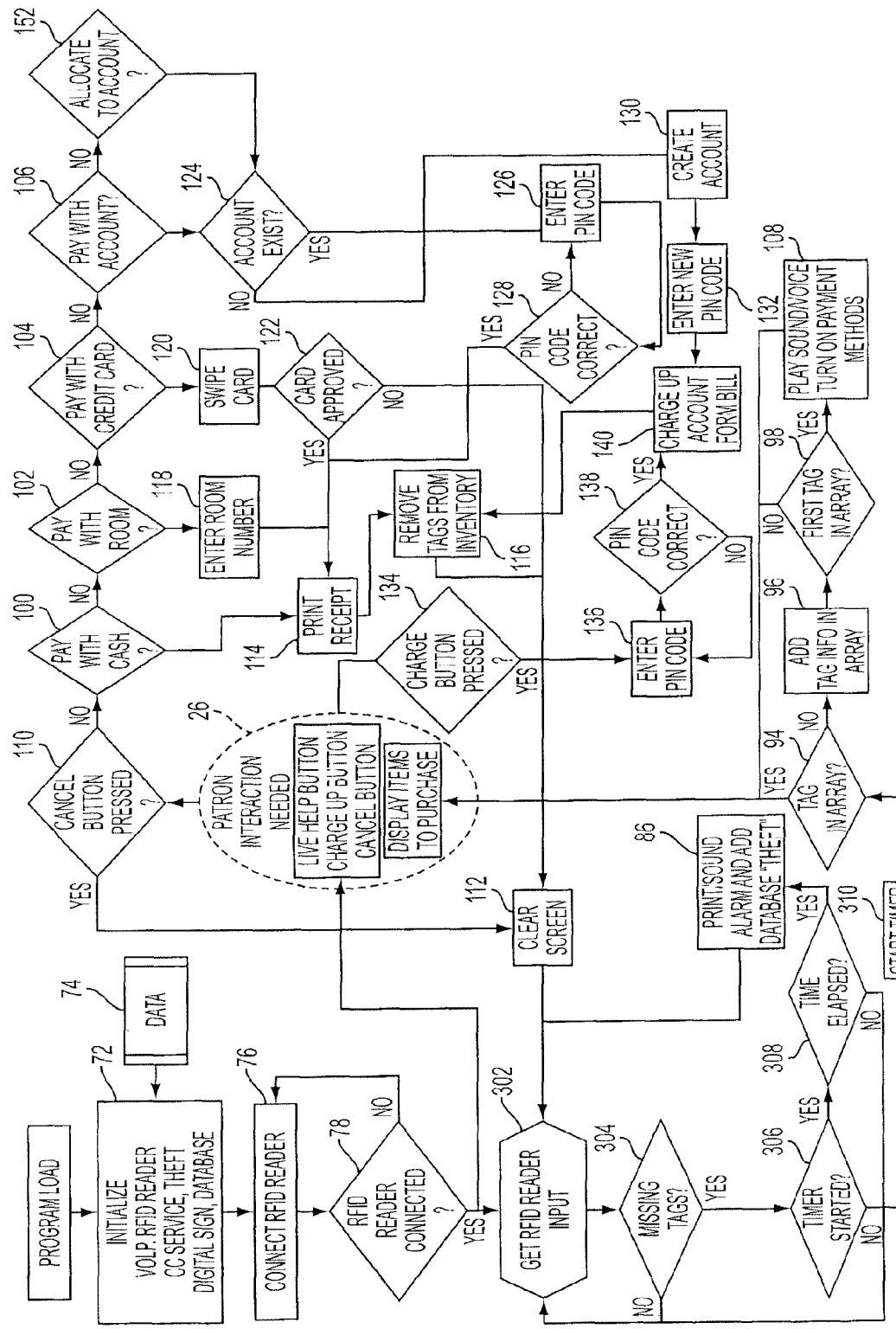
FIG. 15 is a diagrammatic flow chart of the POS software used in conjunction with a smart shelf.

Referring now to FIG. 15, FIG. 15 discloses a flowchart of the software used by smart shelf 166. FIG. 15 is similar to FIG. 7 in that similarly labeled elements behave similarly. For the sake of brevity, only the differences will be discussed. At 74, computer 62 reads data which includes a list of products expected to be on smart shelf 166. Once the RFID reader 168 is verified at 76 and 78, computer 62 gets input from RFID reader 168 at 302. Next, at 304, computer 62 determines whether any expected RFID tags are missing. If no RFID tags are missing, computer 62 returns to 302 to get input from RFID reader 168. If an RFID tag or tags are missing, at 306 computer 62 determines whether a timer for each missing tag is running, while resetting and disabling timers of tags that are present. Disabling the timers for present products ensures that a present product does not get falsely flagged as stolen.

If a timer for a missing tag is running, then at 308 computer 62 determines whether the timer has passed the user-defined time for returning products to smart shelf 166. If the time has elapsed, then at 86 the associated product is labeled as "theft," and the alarm sounds, as described above. Otherwise, computer 62 returns to 302 to get an updated reading of RFID tags.

If at 306 the timer for the missing tag has not been started, then computer 62 starts the timer at 310. Then, at 94, computer 62 starts the self-checkout process as described above. At the end of the self-checkout process, at 116, computer 62 additionally removes the tag from the list of products expected on smart shelf 166.

Figure 17A:
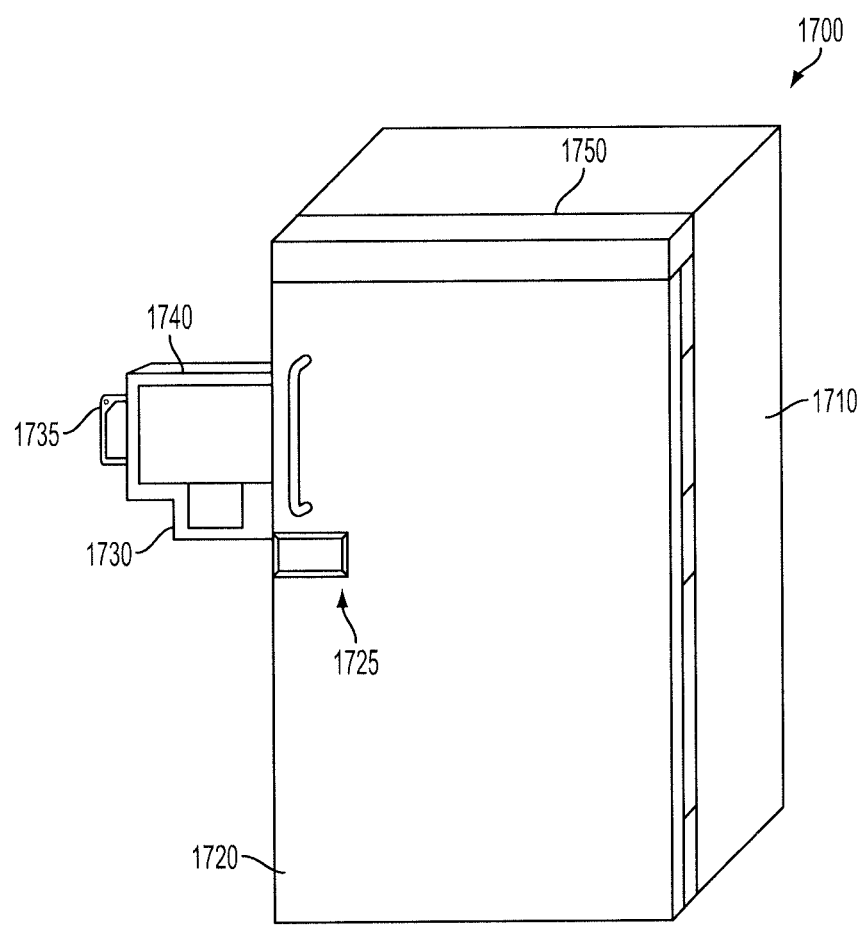
FIG. 17A is a front view of a cabinet store according to an implementation of the present disclosure.
Figure 17B:
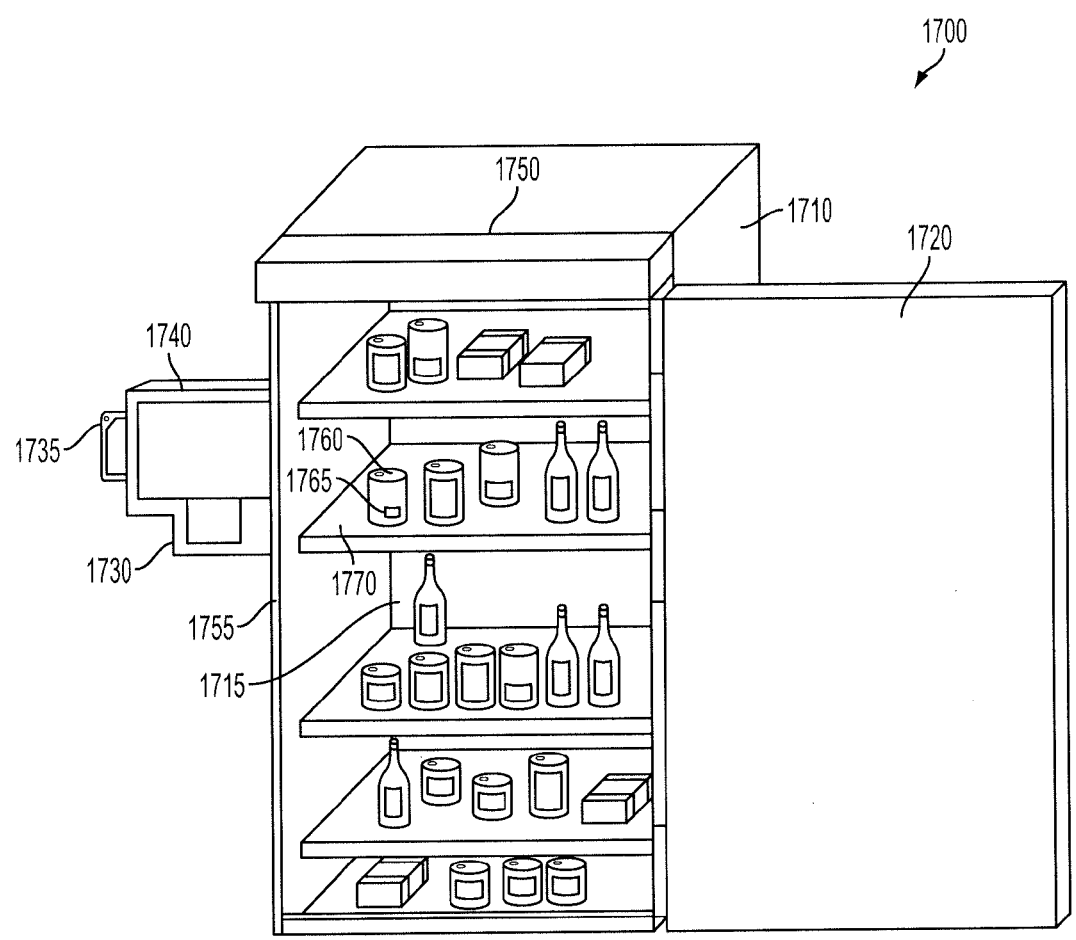
FIG. 17B is the cabinet store of FIG. 17A with the door open.

Turning now to another implementation, FIGS. 17A and 17B depict a cabinet store 1700. The cabinet store 1700 comprises a cabinet 1710, a door 1720, a lock 1725, a checkout reader 1730, a card swipe 1735, a computer 1740, and an RFID reader 1750. The cabinet 1710 defines a vending space 1715 and a doorway 1755, seen in FIG. 17B. A product 1760 with an RFID tag 1765 sits on a shelf 1770 inside the vending space 1715, as seen in FIG. 17B.

The cabinet 1710 may be a cabinet or other similar fixture having a door and an interior storage space. In an exemplary implementation, the cabinet 1710 is a refrigerator which keeps the vending space 1715 at a low temperature. In other implementations, the cabinet 1710 may be other specialized storage, producing specific environmental conditions suitable for storage. For example, the cabinet 1710 may be an oven or other similar heated storage unit. Alternatively, the cabinet 1710 may be a cage or clear container allowing patrons to see its contents.

In FIG. 17A, the door 1720 is closed. When the door 1720 is closed, the lock 1725 is normally locked, preventing access to the vending space 1715. The lock 1725 may be a solenoid lock or any other suitable lock for locking the door 1720 and remotely controllable by the computer 1740. The checkout reader 1730, the card swipe 1735, and the computer 1740 work in conjunction to provide an interface for purchasing items in the vending space 1715. The checkout reader 1730 may be an RFID reader or similar antenna capable of wireless communication. The card swipe 1735 allows a credit card to be read. For example, the card swipe 1735 may read magnetic stripes of a credit card or other card or may be capable of reading RFID signals from the card. In certain implementations, the card swipe 1735 may be configured to accept cash. The computer 1740 may be a tablet computer or other similar computing device having a screen and input device, such as a touchscreen, for providing an interface to a patron. The computer 1740 may connected wired or wirelessly to a network, such as the Internet, for remote communication. In certain implementations, the computer 1740 and/or the checkout reader 1730 may be configured to pair with or otherwise communicate with a mobile device, allowing the patron to complete a transaction through their mobile device, as described above. Alternatively, the mobile device may perform the functions of the computer 1740 described below.

The computer 1740 includes an authentication mechanism that can automatically lock or unlock the lock 1725 with proper authentication. The computer 1740 validates a patron before unlocking the lock 1725. The patron may be validated by having a valid credit card, or an account having a minimum balance. The patron may swipe a credit card through the card swipe 1735. Once the computer 1740 determines that the credit card is valid, the computer 1740 unlocks the lock 1725.

The patron can also be validated by having an account with the minimum balance. The minimum balance may be a predetermined amount, such as $5 or $20, which may be appropriately selected. Alternatively, the minimum balance may vary. For example, the minimum balance may vary based on patron. Certain patrons may have bad credit or a history of problems with self-checkout and may have a higher minimum balance requirement. Certain patrons may have a reduced minimum balance as part of a promotion or other suitable reasons. Alternatively, the minimum balance may correspond to a value of the products in the vending space 1715. For example, the minimum balance may be 50% or 100% of the value of the products in the vending space 1715.

As stated above, the patron may have a charge card. Once swiped, the computer 1740 determines if the charge card has a sufficient balance. Alternatively, the patron may have a member card that is swiped. The member card may be associated with a vendor, such as the operator of the cabinet store 1700. For example, the member card may be associated with a student account at a university operating the cabinet store 1700, or may be associated with a hotel room number at a hotel operating the cabinet store 1700. The computer 1740 may additionally prompt a PIN or password to log into the account. The computer 1740 may then determine whether there is sufficient balance to proceed. If the balance is too low, the computer 1740 may prompt the patron to charge up the account. FIG. 20 illustrates an exemplary screen 2000 for prompting a charge up. The patron may be presented with his current balance, and options to add additional funds to the account. The funds may be paid by credit card, as in FIG. 20. Alternatively, the funds may be paid by cash, or other suitable means. The computer 1740 validates the patron once the balance meets the minimum balance.

In yet other implementations, the patron may be validated by other means. For example, the computer 1740 may include a biometric sensor to identify the patron. Alternatively, the computer 1740 may include a video camera or other video sensor to identify the patron.

When the computer 1740 has validated the patron, the computer 1740 unlocks the lock 1725. The patron may then open the door 1720, as seen in FIG. 17B. While the door 1720 is open, the transaction is pending. The computer 1740 may display a screen similar to FIG. 9 or FIG. 11 summarizing the items for purchase.

Opening the door 1720 exposes the vending space 1715. The vending space 1715 is defined by the cabinet 1710. The doorway 1755 forms a boundary of the vending space 1715, the only opening through which items such as the product 1760 can pass through. As such, monitoring which items pass through the doorway 1755 effectively determines what items are removed. The RFID reader 1750 is located above the door 1720 when closed, as seen in FIG. 17A. However, when the door 1720 is opened, the RFID reader 1750 remains over the doorway 1755. The RFID reader 1750 is configured to detect RFID tags, such as the RFID tag 1765, which pass through the doorway 1755. A radio frequency curtain radiated by the RFID reader 1750 forms a curtain across the entire doorway 1755. Although in FIGS. 17A and 17B the RFID reader 1750 is above the door 1720, in other implementations the RFID reader 1750 may be located elsewhere in order to detect RFID tags passing through the doorway 1755. For instance, the RFID reader 1750 may be located on a sidewall or bottom of the cabinet 1710, or alternatively be located just inside or right along the doorway 1755. In alternative implementations, more than one RFID reader may be placed around the doorway 1755 such that the radio frequency curtains radiated the RFID readers overlap to form a curtain across the entire doorway 1755, so that any attempt to move a product through the doorway 1755 will result in the RFID tag on the product being read.

If the patron wishes to purchase the product 1760, the patron removes the product 1760 from the shelf 1770. The shelf 1770 may be a fixture capable of holding various products 1760. In certain implementations, the shelf 1770 may be a smart shelf with its own RFID reader, as described above. For example, the shelf 1770 may alert the computer 1740 if an item is removed from the shelf by determining that the RFID tag 1765 is away from the shelf 1770. In alternate implementations, a video camera or other video sensor may help determine which items were removed.

When the patron removes the product 1760 from the vending space 1715, the product 1760 must move through the doorway 1755. The RFID reader 1750 detects the RFID tag 1765 passing through the doorway 1755 and communicates this information to the computer 1740. The computer 1740 may then add the product 1760 to a checkout tally.

In implementations in which the shelf 1770 is a smart shelf, the checkout tally may already have the product 1760 added. The RFID reader 1750 may instead confirm that the product 1760 is being purchased. For example, if the product 1760 was removed from the shelf 1770 but not returned to the shelf 1770 or passed through the doorway 1755 within a predetermined amount of time, such as 20 minutes, the computer 1740 may determine that the product 1760 is lost, missing, or stolen, and appropriately notify a system manager and update a database of products, as described above.

The checkout reader 1730 may also be used to confirm items in the checkout tally. The patron may remove the product 1760 from the vending space 1715, and present it to the checkout reader 1730. For instance, the patron may remove various items from the vending space 1715, swipe the desired items across the checkout reader 1730, and return unwanted items back to the vending space 1715.

When the door 1720 is closed, the lock 1725 automatically re-engages to lock the vending space 1715. Closing the door 1720 further signifies that the patron wishes to complete the transaction by purchasing the items in the checkout tally. The computer 1740 includes a purchasing mechanism to accept valid payment by prompting the patron to complete the transaction, displaying a screen similar to FIGS. 9 and 11. The patron may then confirm payment using the previously validated payment. If the patron is using an account with an insufficient balance to complete the transaction, the patron may be prompted with a screen such as the screen 2000 in FIG. 20 to charge up the account. Alternatively, rather than purchase the items, the patron may allocate the items to his account, similar to the allocation described above. The computer 1740 finalizes the transaction and may further update the database.

In certain situations, the computer 1740 may automatically close or cancel the transaction. For example, if items are detected as removed from the vending space 1715, but not otherwise paid for, i.e. with a completed transaction within a predetermined amount of time such as 15 minutes, the computer 1740 may activate security measures. The computer 1740 may mark the items as "stolen" or "missing" in the database. The computer 1740 may notify the system manager of potential theft or an otherwise faulty transaction. By default, the computer 1740 will sell and/or assign the items to the patron that was previously validated.

In addition, the computer 1740 may have an idle timer to time out the transaction if no activity is detected within a predetermined amount of time, such as 10 minutes. For instance, if no items were passed through the doorway 1755 or no actions were taken on the computer 1740 within the predetermined amount of time, the computer 1740 may time out the transaction. When the transaction times out, the computer 1740 forces the transaction to close by completing the transaction and charging the items in the checkout tally as if the patron had actively completed the transaction. The computer 1740 may further alert the system manager about the timed out transaction. In certain implementations, the computer 1740 may present a timer screen displaying a countdown to when the computer 1740 will automatically close the transaction. In certain other implementations, the door 1720 may be motorized such that the computer 1740 can close the door 1720 when the transaction times out. The door 1720 may further have a sensor, such as a pressure sensor or video sensor, to prevent the door 1720 from closing on the patron.

The predetermined amount of time may any suitable period of time. For example, for security reasons, the predetermined amount of time may be 5 minutes. Alternatively, the predetermined amount of time may be selected as a time to prevent the items from spoiling from having the door 1720 open, such as 30 minutes.

In certain implementations, the computer 1740 may actively manage an inventory inside the vending space 1715, and keep the database updated. The computer 1740 may be aware of what items passed through the doorway 1755. The computer 1740 may further determine which direction the items passed, e.g. into the vending space 1715 or out of the vending space 1715. For example, if the shelf 1770 is a smart shelf, the computer 1740 can determine whether an item was removed or added. In addition, the cabinet 1710 may have additional sensors or RFID readers such that the computer 1740 can determine a current inventory. The computer 1740 may dynamically update the database.

Figure 18A:
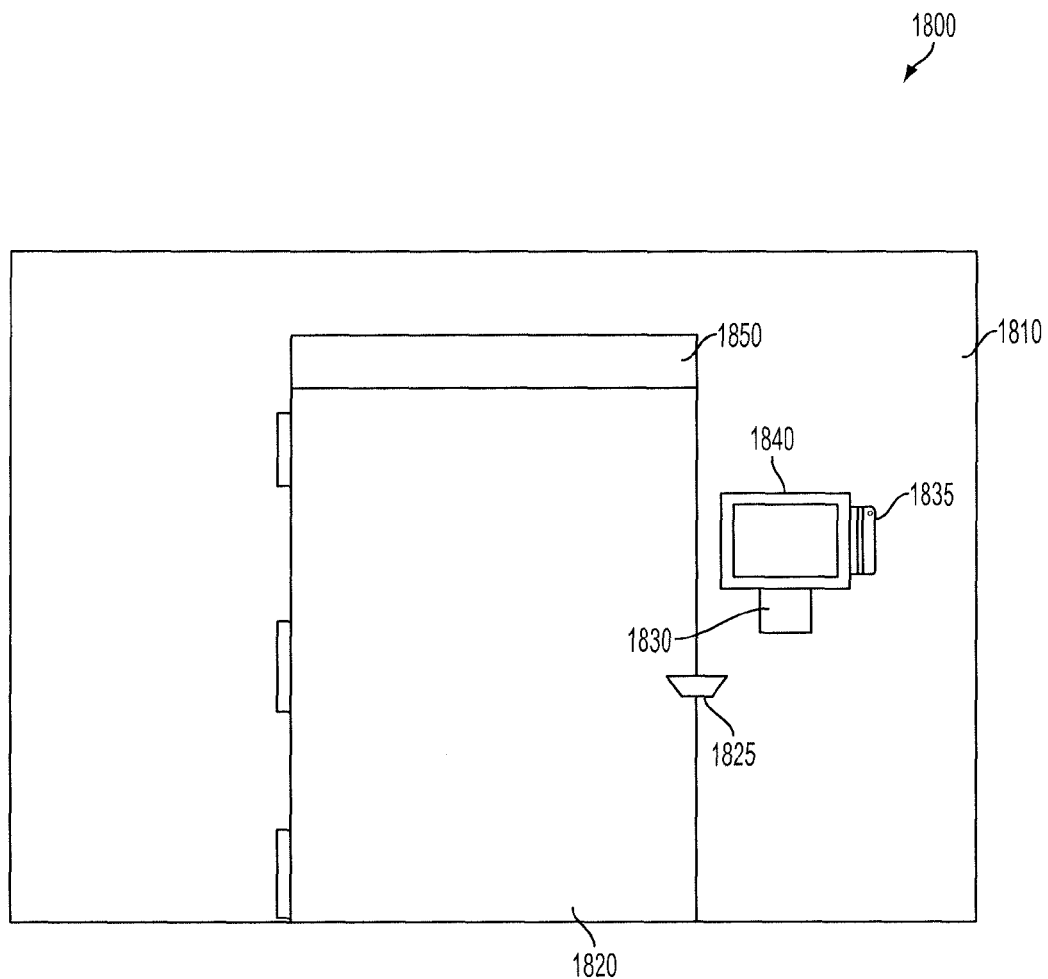
FIG. 18A is a front view of a walk-in store according to an implementation of the present disclosure.
Figure 18B:
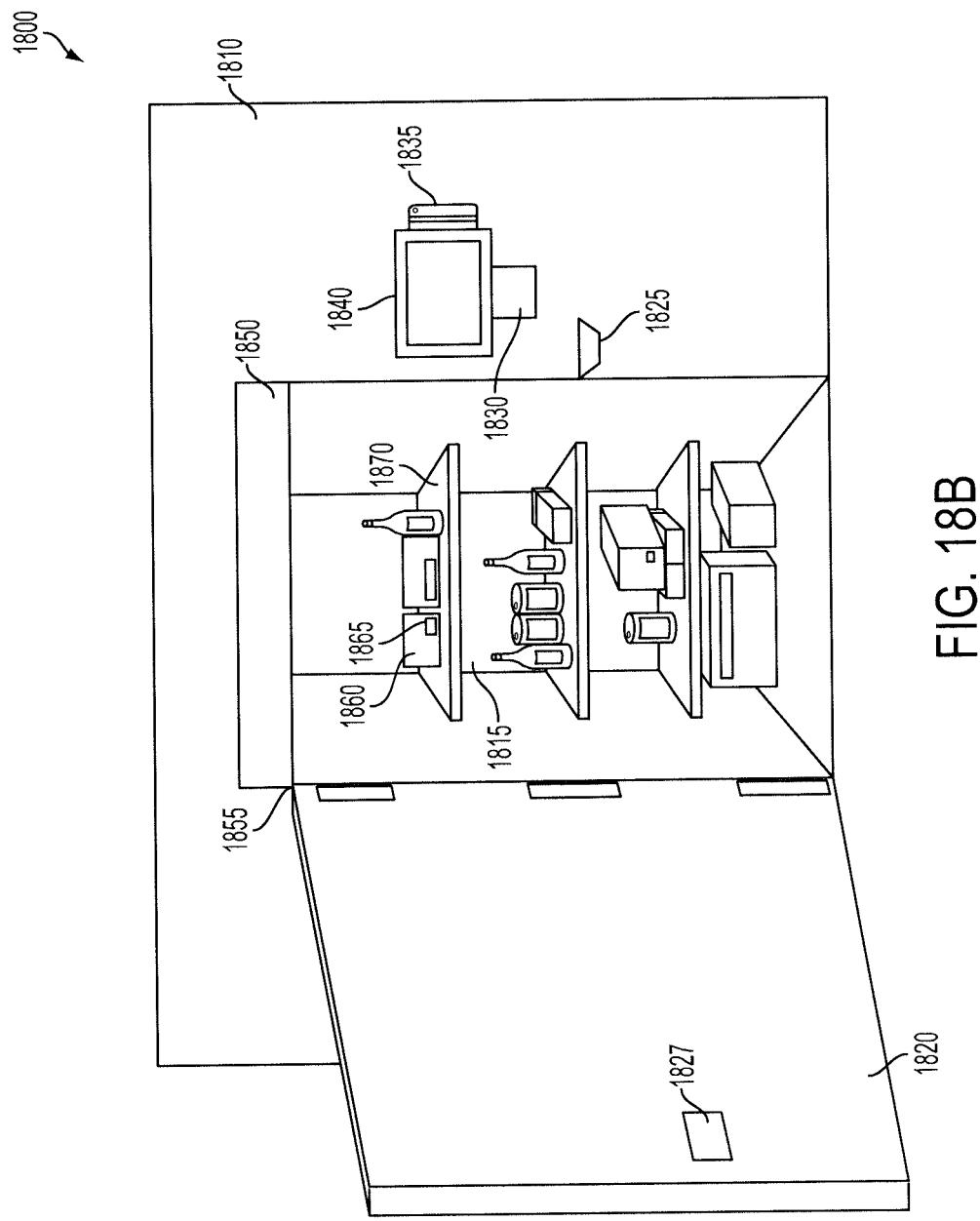
FIG. 18B is the walk-in store of FIG. 18A with the door open.

FIGS. 18A and 18B depict a walk-in store 1800. The walk-in store 1800 comprises a room 1810, a door 1820, a lock 1825, a checkout reader 1830, a card swipe 1835, a computer 1840, and an RFID reader 1850. The room 1810 defines a vending space 1815 and a doorway 1855, seen in FIG. 18B. A product 1860 with an RFID tag 1865 sits on a shelf 1870 inside the vending space 1815, as seen in FIG. 18B. The walk-in store 1800 operates similarly to the cabinet store 1700 in that similarly numbered elements may behave similarly. For the sake of brevity, the differences will be discussed.

The room 1810 may be a room or other similar structure having a door and an interior storage space. The room 1810 may be large enough for the patron to enter and peruse the items in the vending space 1815. In an exemplary implementation, the room 1810 is a small room such as a cage or a closet sized glass box. The room 1810 may have at least one wall that is substantially transparent to allow the patron to view the vending space 1815. In other implementations, the room 1810 may be other specialized storage, managing specific environmental conditions suitable for storage such as temperature, moisture, humidity, or light. For example, the room 1810 may be a refrigerated room or a heated room. Alternatively, the room 1810 may be an add-on to an existing structure.

The checkout reader 1830, the card swipe 1835, and the computer 1840 are similar to the checkout reader 1730, the card swipe 1735, and the computer 1740, respectively. In addition, the patron may use a mobile device in place of the computer 1840, or to complete the transaction as described above.

In FIG. 18A, the door 1820 is closed. When the door 1820 is closed, the lock 1825 is normally locked, preventing access to the vending space 1815. The lock 1825 may be a solenoid lock or any other suitable lock for locking the door 1820 and remotely controllable by the computer 1840. Similar to the cabinet store 1700, the computer 1840 unlocks the lock 1825 after validating a patron, who may be validated by having a valid credit card or a valid account with the minimum balance. The patron may be prompted with the screen 2000 to charge up the account if the current balance is insufficient.

Once the patron is validated, as described above with respect to the cabinet store 1700, the computer 1840 unlocks the lock 1825. The patron may open the door 1820, as seen in FIG. 18B. Similar to the cabinet store 1700, the transaction is pending while the door 1820 is open and the computer 1840 may display a screen similar to FIG. 9 or FIG. 11. The room 1810 defines the vending space 1815. The doorway 1855 forms a boundary of the vending space 1815, the only opening through which items such as the product 1860 can pass through. The RFID reader 1850 is configured such that its radio frequency curtain forms a curtain across the entire doorway 1855. The RFID reader 1850 is located adjacent the doorway 1855 and above the door 1820. In other implementations, the RFID reader 1850 may be located along other sides of the doorway 1855, or may comprise multiple RFID readers along the doorway 1855.

However, unlike the cabinet store 1700, the patron may enter the room 1810. Once the patron enters the room 1810, the door 1820 closes and the lock 1825 locks. The door 1820 may close automatically, such as through a spring or pneumatic or motorized mechanism which may also be controlled by the computer 1840. Closing and locking the door 1820 and the lock 1825 limits unauthorized access, in particular with respect to the patron's credit card or account. In certain implementations, additional security features, such as a turnstile or a camera, may further limit unauthorized access. For safety reasons, the lock 1825 is unlockable from inside the room 1810. A panel 1827, which may be on the inside of the door 1820 as in FIG. 18B, or on an inside wall of the room 1810, allows the patron to unlock the lock 1825. The panel 1827 may be another computer or tablet computer, similar to the computer 1840, which allows further system interaction to unlock the lock 1825. The door 1820 may be pushed from the inside to unlock the lock 1825, for instance if the walk-in store 1800 lost power.

Similar to the cabinet store 1700, the patron removes the product 1860, having the RFID tag 1865, from the shelf 1870 to purchase it. The shelf 1870 may be a smart shelf, as described above, capable of detecting when the product 1860 has been removed. After the patron removes all the desired items, the patron may re-open the door 1820 and exits through the doorway 1855. The RFID reader 1850 detects the items carried through the doorway 1855 and accordingly updates a checkout tally. When the door 1820 is closed, the lock 1825 automatically re-engages to lock the vending space 1815. The patron may then complete the transaction to purchase or allocate the items in the checkout tally on the computer 1840, which may display a screen similar to FIGS. 9 and 11. The patron may be presented with the screen 2000 if the account has insufficient balance for the transaction. Similar to the computer 1740, the computer 1840 may automatically close or cancel the transaction, activate security measures when needed, and update the database accordingly.

Figure 19:
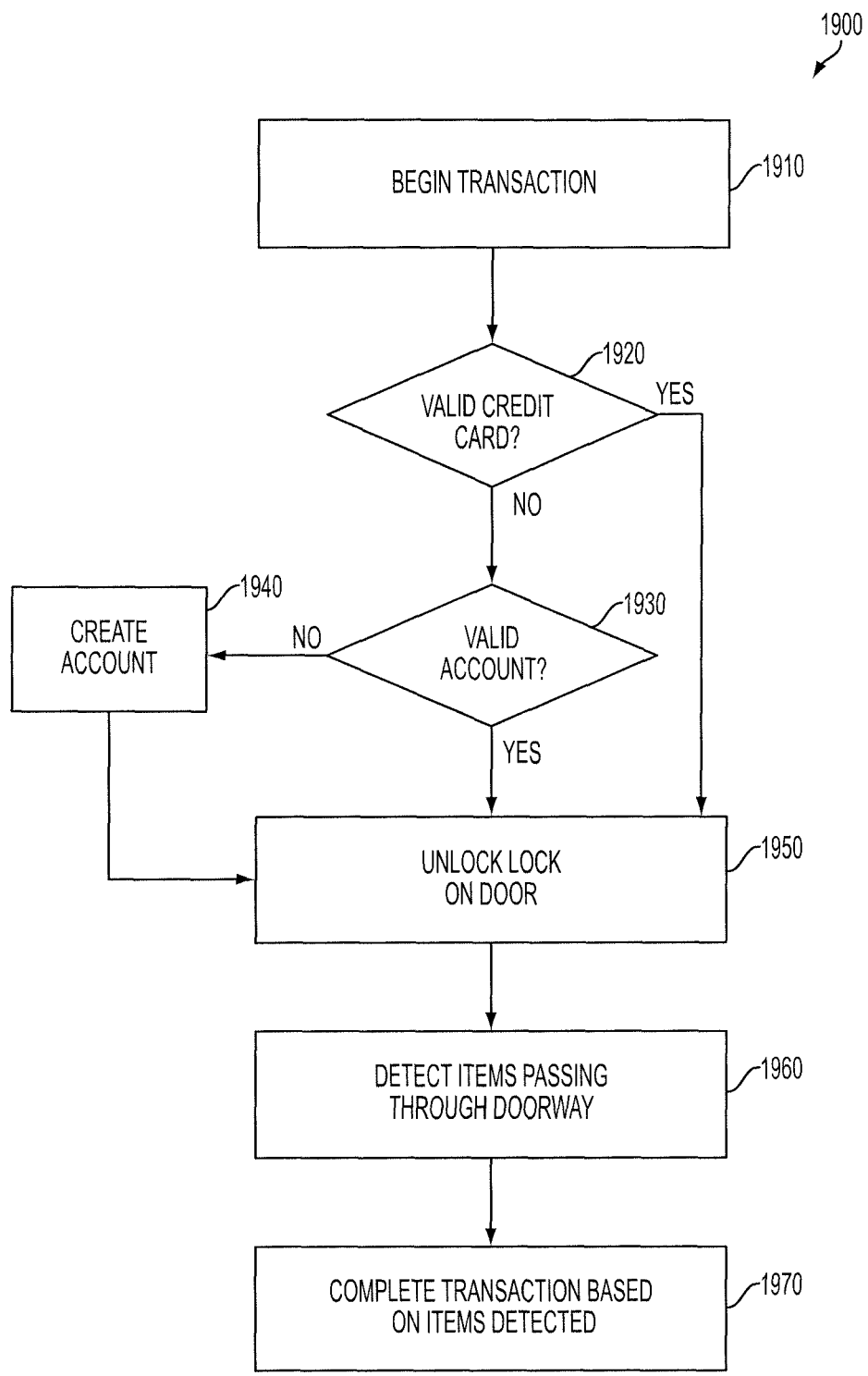
FIG. 19 is a flowchart of the POS software used in conjunction with a cabinet store or a walk-in store according to an implementation of the present disclosure.

FIG. 19 presents a simplified flowchart 1900 of a POS software logic that may be used by the computer 1740 or the computer 1840. At 1910, the transaction begins. For instance, the patron may approach the computer 1740 or 1840. At 1920, the computer checks for a valid credit card. If a valid credit card was presented, the computer unlocks the door, such as the door 1720 or 1820, at 1950.

If no valid credit card was presented, at 1930 the computer checks for a valid account. For example, the patron may input a member ID or swipe a member card and provide a password and/or PIN. The computer may allow the patron several tries for a valid account. If the account was not valid, then at 1940 the patron may have the option to create a new account. Alternatively, if the patron does not create a new account or fails to otherwise be validated, the transaction will end.

At 1950, the lock, such as the lock 1725 or 1825, on the door is unlocked after the patron is validated. At 1960, an RFID reader, such as the RFID reader 1750 or 1850, detects items passing through the doorway, such as the doorway 1755 or 1855. Then, at 1970, the transaction is completed based on the items detected at 1960. The payment comes from the previously used validation, which may be a credit card or an account balance.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An unattended checkout system comprising:
 a cabinet having a doorway and walls defining a vending space;
 a door having a lock and attached to the cabinet, the door configured to close over the doorway to enclose the vending space;
 at least one product configured for placement in the vending space and located in the vending space;
 a radio frequency identification (RFID) tag attached to the at least one product;
 an RFID reader adjacent the door and configured to read product data from the RFID tag and detect if the at least one product passed through the doorway;
 a database configured to store an inventory of products located in the vending space and products previously in the vending space which are currently allocated to an account;
 a self-checkout apparatus connected to the database and configured to:
  unlock the lock when valid account credentials associated with an account are detected,
  update a checkout list to include the at least one product after the at least one product passed from the vending space and through the doorway,
  present a confirmation display of the checkout list, and
  allocate all products in the checkout list to the account associated with the account credentials upon receiving a confirmation indication.

2. The unattended checkout system of claim 1, wherein the account credentials are presented on a mobile device.

3. The unattended checkout system of claim 1, wherein the self-checkout apparatus is configured to pair with a mobile device and the confirmation display is displayed on the mobile device.

4. The unattended checkout system of claim 1, wherein the self-checkout apparatus includes a display configured to display the confirmation display and receive the confirmation indication.

5. The unattended checkout system of claim 1, wherein the lock is configured to be automatically locked when the door is closed over the doorway.

6. The unattended checkout system of claim 1, wherein the self-checkout apparatus is located on an exterior wall of the cabinet.

7. The unattended checkout system of claim 1, wherein the allocating each product in the checkout list to the account associated with the account credentials comprises updating the database to associate each product in the checkout list with the account associated with the account credentials.

8. An unattended checkout system comprising:
a room having an entryway and walls defining a vending space;
a barrier having a lock and attached to the entryway, the barrier configured to restrict access to the vending space;
at least one product configured for placement in the vending space and located in the vending space;
a radio frequency identification (RFID) tag attached to the at least one product;
an RFID reader adjacent the entryway and configured to read product data from the RFID tag and detect when the at least one product passes through the entryway;
a database configured to store an inventory of products located in the vending space and products previously in the vending space which are currently allocated to an account;
a self-checkout apparatus connected to the database and configured to:
unlock the lock when valid account credentials associated with an account are detected,
update a checkout list to include the at least one product after the at least one product passes from the vending space and through the entryway,
present a confirmation display of the checkout list, and
allocate all products in the checkout list to the account associated with the account credentials upon receiving a confirmation indication.

9. The unattended checkout system of claim 8, wherein the account credentials are presented on a mobile device.

10. The unattended checkout system of claim 8, wherein the self-checkout apparatus is configured to pair with a mobile device and the confirmation display is displayed on the mobile device.

11. The unattended checkout system of claim 8, wherein the self-checkout apparatus includes a display configured to display the confirmation display and receive the confirmation indication.

12. The unattended checkout system of claim 8, wherein the lock is configured to be automatically locked when the door is closed over the doorway.

13. The unattended checkout system of claim 8, wherein the self-checkout apparatus is located on an exterior wall of the room.

14. The unattended checkout system of claim 8, wherein the allocating each product in the checkout list to the account associated with the account credentials comprises updating the database to associate each product in the checkout list with the account associated with the account credentials.

15. A method for purchasing products comprising:
receiving account credentials on a self-checkout apparatus;
automatically unlocking a lock of a door to an enclosed vending space when the account credentials are valid, the enclosed vending space housing a product having a radio frequency identification (RFID) tag;
detecting, using an RFID reader adjacent to the door, the product leaving the enclosed vending space;
updating a checkout list to include the product after the product leaves the enclosed vending space;
presenting a confirmation display of the checkout list; and
allocating each product in the checkout list to the account associated with the account credentials upon receiving a confirmation indication.

16. The method of claim 15, wherein the account credentials are presented on a mobile device.

17. The method of claim 15, further comprising pairing the self-checkout apparatus with a mobile device, and displaying the confirmation display on the mobile device.

18. The method of claim 15, further comprising automatically locking the lock when the door is closed over the doorway.

19. The method of claim 15, wherein the account is associated with a payment method.

20. The method of claim 15, wherein the allocating each product in the checkout list to the account associated with the account credentials comprises updating the database to associate each product in the checkout list with the account associated with the account credentials.

* * * * *